US007899917B2

(12) United States Patent
Chitre et al.

(10) Patent No.: US 7,899,917 B2
(45) Date of Patent: Mar. 1, 2011

(54) SYNCHRONIZATION FRAMEWORK FOR OCCASIONALLY CONNECTED APPLICATIONS

(75) Inventors: Sudarshan A. Chitre, Redmond, WA (US); Steven M. Lasker, Sammamish, WA (US); Rafik Robeal, Redmond, WA (US); Yi Chen, Redmond, WA (US); Vijay Krishna Tandra Sistla, Sammamish, WA (US); Philip Austin Vaughn, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 575 days.

(21) Appl. No.: 11/670,369

(22) Filed: Feb. 1, 2007

(65) Prior Publication Data

US 2008/0189439 A1 Aug. 7, 2008

(51) Int. Cl.
G06F 15/16 (2006.01)
(52) U.S. Cl. ..................... 709/228; 707/610
(58) Field of Classification Search ......... 709/246–250; 707/610
See application file for complete search history.

(56) References Cited

U.S. PATENT DOCUMENTS

| 4,677,474 | A | | 6/1987 | Sato et al. | |
|---|---|---|---|---|---|
| 4,786,867 | A | | 11/1988 | Yamatsu | |
| 5,675,791 | A | * | 10/1997 | Bhide et al. | 707/205 |
| 5,737,601 | A | * | 4/1998 | Jain et al. | 707/201 |
| 5,936,416 | A | | 8/1999 | Tanaka et al. | |
| 5,974,238 | A | * | 10/1999 | Chase, Jr. | 709/248 |
| 6,140,828 | A | | 10/2000 | Iino et al. | |
| 6,226,650 | B1 | * | 5/2001 | Mahajan et al. | 707/201 |
| 6,549,917 | B1 | | 4/2003 | Pollard et al. | |
| 6,578,054 | B1 | * | 6/2003 | Hopmann et al. | 707/625 |
| 6,643,669 | B1 | | 11/2003 | Novak et al. | |
| 6,769,048 | B2 | | 7/2004 | Goldberg et al. | |
| 6,839,744 | B1 | | 1/2005 | Kloba et al. | |
| 6,915,312 | B2 | | 7/2005 | Bodnar et al. | |
| 6,947,967 | B2 | | 9/2005 | Ferris et al. | |

(Continued)

FOREIGN PATENT DOCUMENTS

EP 1693771 EP 8/2006

(Continued)

OTHER PUBLICATIONS

J. Munson and P. Dewan. Sync: A system for mobile collaborative applications. IEEE Computer, 30(6):59-66, 1997. ftp://ftp.cs.unc.edu/pub/users/dewan/papers/sync.ps (Continued)

Primary Examiner—William C Vaughn, Jr.
Assistant Examiner—Ninos Donabed
(74) Attorney, Agent, or Firm—Workman Nydegger

(57) ABSTRACT

A synchronization framework is provided for synchronizing data groups between a server and clients that may go off-line. The framework includes a client sync provider component that interfaces to client storage in a storage format independent way, a sync agent component that collects synchronization metadata maintained by the clients and uploads and/or downloads changes to the data groups to and/or from server storage and a server sync provider component that interfaces via sync adapters to server storage independently of storage format. The framework provides default building blocks for building off-line synchronizing applications that behave according to default application synchronization scenarios, and also enables custom building blocks for custom off-line application synchronization scenarios.

14 Claims, 18 Drawing Sheets

U.S. PATENT DOCUMENTS

| | | | |
|---|---|---|---|
| 6,976,077 | B1 | 12/2005 | Lehew et al. |
| 7,013,316 | B1 | 3/2006 | Hansen et al. |
| 7,035,847 | B2 | 4/2006 | Brown et al. |
| 7,058,718 | B2* | 6/2006 | Fontes et al. ............... 709/228 |
| 7,716,205 | B1* | 5/2010 | Agapiev .................... 707/707 |
| 7,720,890 | B2* | 5/2010 | Rao et al. .................. 707/821 |
| 7,743,019 | B2* | 6/2010 | Shah et al. ................. 707/610 |
| 7,792,790 | B2* | 9/2010 | Kim ........................... 707/609 |
| 7,853,961 | B2* | 12/2010 | Nori et al. .................. 719/328 |
| 2002/0078075 | A1 | 6/2002 | Colson |
| 2003/0158947 | A1 | 8/2003 | Bloch et al. |
| 2003/0233404 | A1 | 12/2003 | Hopkins |
| 2004/0064570 | A1 | 4/2004 | Tock |
| 2004/0073560 | A1* | 4/2004 | Edwards .................... 707/100 |
| 2005/0027755 | A1 | 2/2005 | Shah |
| 2005/0108251 | A1 | 5/2005 | Hunt et al. |
| 2005/0114431 | A1 | 5/2005 | Singh |
| 2005/0154872 | A1 | 7/2005 | McGrew et al. |
| 2005/0228812 | A1* | 10/2005 | Hansmann et al. ......... 707/102 |
| 2005/0243020 | A1 | 11/2005 | Steeb |
| 2006/0015619 | A1* | 1/2006 | Tse et al. ................... 709/226 |
| 2006/0031264 | A1 | 2/2006 | Bosworth et al. |
| 2006/0074996 | A1 | 4/2006 | Corbett |
| 2006/0106879 | A1 | 5/2006 | Zondervan |
| 2006/0112150 | A1* | 5/2006 | Brown et al. ............... 707/201 |
| 2006/0117073 | A1 | 6/2006 | Bosworth |
| 2006/0136517 | A1 | 6/2006 | Creamer et al. |
| 2006/0167975 | A1 | 7/2006 | Chan et al. |
| 2006/0173959 | A1 | 8/2006 | McKelvie et al. |
| 2006/0190506 | A1 | 8/2006 | Rao et al. |
| 2006/0200570 | A1 | 9/2006 | Stirbu et al. |
| 2006/0206583 | A1 | 9/2006 | Hill |
| 2007/0016695 | A1* | 1/2007 | Rabbers et al. ............. 709/248 |
| 2007/0276836 | A1* | 11/2007 | Chatterjee et al. ............. 707/10 |
| 2007/0288548 | A1* | 12/2007 | Creamer et al. ............. 709/202 |
| 2008/0162728 | A1* | 7/2008 | Robeal et al. ............... 709/248 |
| 2008/0168184 | A1* | 7/2008 | Freedman et al. .......... 709/248 |
| 2009/0216815 | A1* | 8/2009 | Braginsky et al. .......... 707/203 |

FOREIGN PATENT DOCUMENTS

| | | |
|---|---|---|
| JP | 1-227449 | 9/1989 |
| JP | 7-29741 | 11/1995 |
| JP | 8-213436 | 8/1998 |

OTHER PUBLICATIONS

Kistler, J. J., Satyanarayanan, M., Disconnected Operation in the Coda File System. ACM Transactions on Computer Systems 10(1), Feb. 1992. http://www.cs.cmu.edu/afs/cs/project/coda-www/ResearchWebPages/docdir/s13.pdf.

P. Seshadri, P. Garrett: SQLServer for Windows CE—A Database Engine for Mobile and Embedded Platforms, Int. Conf. on Data Engineering (ICDE), 2000. http://ieeexplore.ieee.org/iel5/6778/18144/00839481.pdf?is Number=.

Alan Shieh and Andrew C. Myers and Emin Emin; Trickles: A Stateless Network Stack for Improved Scalability, Resilience, and Flexibility, Proceedings of the 2nd USENIX Symposium on Networked Systems Design and Implementation (NSDI '05), Boston, MA, USA, May 2005. https://www.usenix.org/events/nsdi05/tech/full_papers/shieh/shieh_html/.

G. Cao, "A Scalable Low-Latency Cache Invalidation Strategy for Mobile Environments," IEEE Transactions on Knowledge and Data Engineering, vol. 15, No. 5, Sep./Oct. 2003 (A preliminary version appeared in ACM MobiCom'00). http://portal.acm.org/citation.cfm?coll=GUIDE&dl=GUIDE&id=345945.

International Search Report and Written Opinion for PCT Application Serial No. PCT/US2008/052697, mailed Jul. 14, 2008, 11 pages.

"SyncML-Getting the Mobile Internet in Sync" Jonsson, A. et al., Ericsson Review L M Ericsson Sweden vol. 78, No. 3; 2001, pp. 110-115.

"A Software Library for SyncML Server Applications" Ji Yeon Lee et al., International Conference on Software Engineering Research and Practice—Serp 2003, vol. 2, Jun. 23, 2003, Jun. 26, 2003, pp. 533-537.

* cited by examiner

SYNCHRONIZATION FRAMEWORK FOR OCCASIONALLY CONNECTED APPLICATIONS

TECHNICAL FIELD

The subject disclosure relates to a synchronization framework for synchronizing data among clients and server data stores where the clients may come out of contact with the servers for indefinite periods, e.g., for offline applications.

BACKGROUND

Conventionally, from a synchronization standpoint, a fixed relationship has been implemented between client and server, and so synchronization of data has been hardwired and dedicated between the client and server with limitations on flexibility and scalability as a result. Additionally, where a client may become disconnected from the server, due to network unavailability, power loss, or some other reason, there should also be a way to proceed despite the disconnection, i.e., when a client application is off-line from a main server. Today, as between the single client and server, this off-line behavior is either unavailable, or fixed, i.e., performed according to static behavior that also has limitations on flexibility and scalability.

Moreover, conventionally, these dedicated synchronization relationships, whether offline or online, suffer from the complexity of the synchronization data types maintained and utilized when communicating synchronized data according to fixed and rigid synchronization frameworks, which are often dependent on particular database formats being present in storage giving rise to synchronization incompatibility issues. Complicating matters, assurance of proper synchronization and replication becomes especially complex when multiple clients are allowed to come in and out of contact with the server, often at too great a cost to the server maintaining synchronization relationships with all of the clients.

Generally speaking, occasionally connected applications are defined as applications that connect to a remote data source, such as a database, web service, etc. to read/write data that is desired for the functioning of the application. Additionally, these applications have a requirement to continue to work seamlessly even when they are offline, i.e., not connected to the remote data source. The reason to work offline can be unavailability of network or for better data-access performance.

Existing systems for building applications for synchronizing relational data include remote data access (RDA), Merge Replication and ADO.NET DataSets. However, RDA and Merge Replication provide end-to-end solutions as opposed to building blocks and are tied to the data store formats on both server and client sides. For another example of a limitation on existing systems, RDA can only be used when the client is Microsoft's SQL Server Compact Edition and the server is Microsoft SQL Server. Additionally, while ADO.NET disconnected DataSets are not bound to the store, they have other limitations like their requirement of being loaded entirely in memory without any ability to download incremental changes from the server.

Thus, existing solutions are at opposite ends of the spectrum. At one end, solutions like RDA and ADO.NET are simple, but they have very limited features, e.g., these do not support downloading incremental data. In this regard, sending all the data from server to client for every synchronization can be expensive especially over slow links. RDA also requires the client database to be a SQL client and DataSets are not backed by a client database so they lack efficient query capabilities of the cache. And on the other end of the spectrum, solutions like Merge replication, while providing rich features like dynamic filtering and logical records, are overly complex and rigid, providing the developer very little flexibility to customize the solution to fit their own needs. With solutions like Merge, the developer gets all or nothing. Accordingly, what is desirable is a generalizable synchronization framework including building blocks for building customized synchronization applications that suit the functionality and context of the application being deployed.

Today, to the extent that any systems have attempted to address synchronization to multiple clients, the solutions have been limited to replication of a whole set of database information to all of the clients, and there has been no way to selectively synchronize one or more subsets of the database information, e.g., in the event that a client may wish to just synchronize with a small portion of the relevant data. For instance, a client may wish to retrieve only the last month of email, as opposed to the whole email database file, but today, there is no way to arbitrarily or dynamically limit or filter the data that is synchronized between client and server without reconfiguring synchronization to synchronize another set of data in a new static fashion.

Thus, to synchronize data of a data store from a server to several clients, and vice versa, synchronization and replication of updates, or changes, must take place among the various devices. Accordingly, what is desired is a synchronization framework that addresses each of the above-identified problems in the state of the art of synchronization and replication of data between a server and loosely coupled clients. For instance, a framework is desirable that makes it simple for application developers by implementing components that are able to work with and process concepts and data types with which developers are already familiar. In addition, a synchronization framework is desired that enables a highly scalable server for a variety of loosely coupled devices as they come into and out of contact with the server, and that operates independent of database format.

Accordingly, in consideration of the lack of sophistication of the current state of the art of synchronization of data between a server and loosely coupled clients, it would be desirable to provide an improved synchronization framework for servers and clients. These and other deficiencies in the state of the art of synchronization in the context of loosely coupled devices will become apparent upon description of the various exemplary non-limiting embodiments of the invention set forth in more detail below.

SUMMARY

The present invention provides a synchronization framework for synchronizing data groups between a server and clients that may go off-line. The framework includes a client sync provider component that interfaces to client storage in a storage format independent way, a sync agent component that collects synchronization metadata maintained by the clients and uploads and/or downloads changes to the data groups to and/or from server storage and a server sync provider component that interfaces via sync adapters to server storage independently of storage format. The framework provides default building blocks for building off-line synchronizing applications that behave according to default application synchronization scenarios, and also enables custom building blocks for custom off-line application synchronization scenarios.

A simplified summary is provided herein to help enable a basic or general understanding of various aspects of exemplary, non-limiting embodiments that follow in the more detailed description and the accompanying drawings. This summary is not intended, however, as an extensive or exhaustive overview. Instead, the sole purpose of this summary is to present some concepts related to some exemplary non-limiting embodiments of the invention in a simplified form as a prelude to the more detailed description of the various embodiments of the invention that follows.

BRIEF DESCRIPTION OF THE DRAWINGS

The synchronization framework of the present invention is further described with reference to the accompanying drawings in which.

DETAILED DESCRIPTION

Overview

Figure 1A:
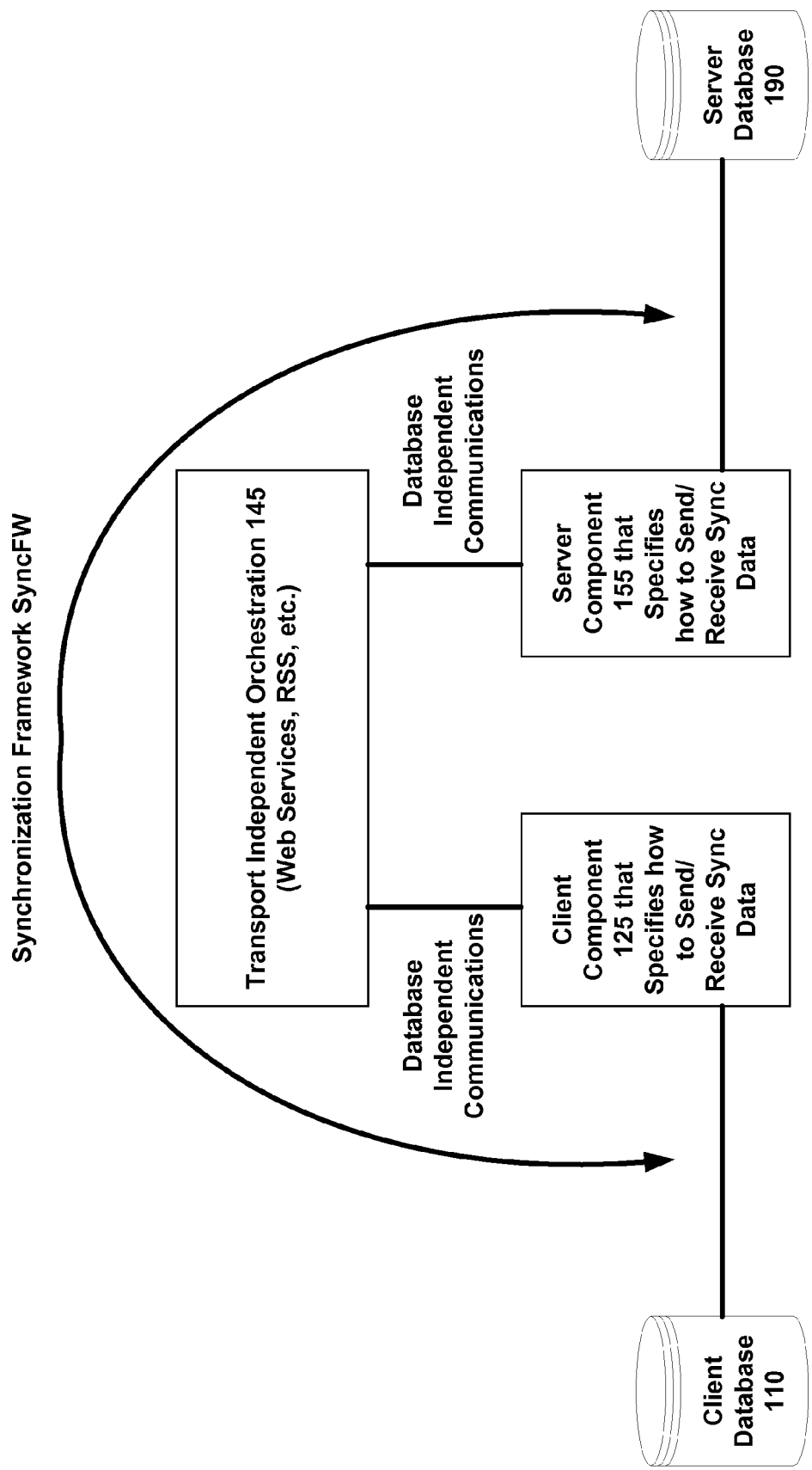
FIGS. 1A and 1B are block diagrams of the framework architecture for synchronizing with offline applications in accordance with the invention.

As discussed in the background, existing synchronization solutions implement an overly complex object model, are too tightly coupled to be useful for offline applications and their scalability is limited due to server overhead. Accordingly, in consideration of these deficiencies in the state of the art, the present invention provides a synchronization framework and corresponding methods for use in the context of a server and loosely coupled clients.

As mentioned, occasionally connected applications are defined as applications that connect to a remote data source, such as a database, web service, etc. to read/write data that is desired for the functioning of the application. Additionally, these applications have a requirement to continue to work seamlessly even when they are offline, i.e., not connected to the remote data source. The reason to work offline can be unavailability of network or for better data-access performance.

In accordance with various non-limiting embodiments of the invention, occasionally connected applications are provisioned with a data cache to hold the data when they are offline and a mechanism to synchronize this cache with the remote store when the network is available. As discussed in the background, any solutions that exist today are inadequate to build custom synchronization applications. Thus, the present invention provides a synchronization framework including building blocks for building customized synchronization applications for a variety of client/server synchronization scenarios.

In various non-limiting embodiments described in more detail below, the invention provides a set of building blocks for developers to build occasionally connected applications. The framework includes the components to build simple synchronization solutions very quickly while also having full flexibility to build complex solutions using the building blocks.

As will be described in greater detail below, the following is an exemplary, non-limiting list of scenarios made possible by this framework: (A) read-only cache of data on client, i.e., snapshot sync, (B) read-only cache of data on client with incremental sync to keep cache up-to-date, i.e., incremental download sync, (C) store and forward capabilities from client to server, i.e., upload only sync, (D) read-write cache of data on client, i.e., bidirectional sync, with framework to support conflict detection and resolution with multiple clients change the same data, (E) synchronizing with pre-existing server without need for any provisioning on the server side, (F) synchronizing with heterogeneous servers, e.g., SQL, Oracle, etc. (G) synchronizing with a custom Internet enabled services, (H) the ability to plug in different client stores, e.g., SQL Server Compact Edition, SQL Express, etc., (I) the ability to plug in a custom transport between client and server and (J) the ability to plug in custom change tracking on the store.

Synchronization Framework for Offline Applications

A synchronization framework is provided in accordance with the invention that can be used to develop and support offline applications. An overview of the application framework for synchronizing data for offline applications is illustrated in the exemplary non-limiting block diagrams of FIG. 1A and FIG. 1B.

As generally shown in the block diagram of FIG. 1A, a synchronization framework SyncFW is provided for synchronizing data of server database 190 with data of client database 110 for scenarios where a client application may become disconnected. On the client side, a component 125 is provided in the framework that specifies how to send/receive client-side sync data and that makes communications independent of the format of client database 110. For instance, component 125 can plug into different client stores, e.g., SQL Server Compact Edition, SQL Express, etc.).

On the server side, a component 155 is provided that specifies how to send/receive server-side sync data and that also communicates independently of the format of server database 190, enabling the ability to synchronize with heterogeneous servers, e.g., SQL, Oracle, etc.

Advantageously, orchestration 145 of sync data between the client and the server is handled in transport independent manner, i.e., whether Web Services, RSS, etc., the data can be processed regardless of how the data is packaged between components 125 and components 155. In one non-limiting embodiment, data is synchronized between a client application and a custom designed web-service. Advantageously, the invention thus includes the ability to plug in a custom transport between client and server, and thus the communications between client and server for the framework of the invention are not limited to any particular transport means.

Figure 1B:
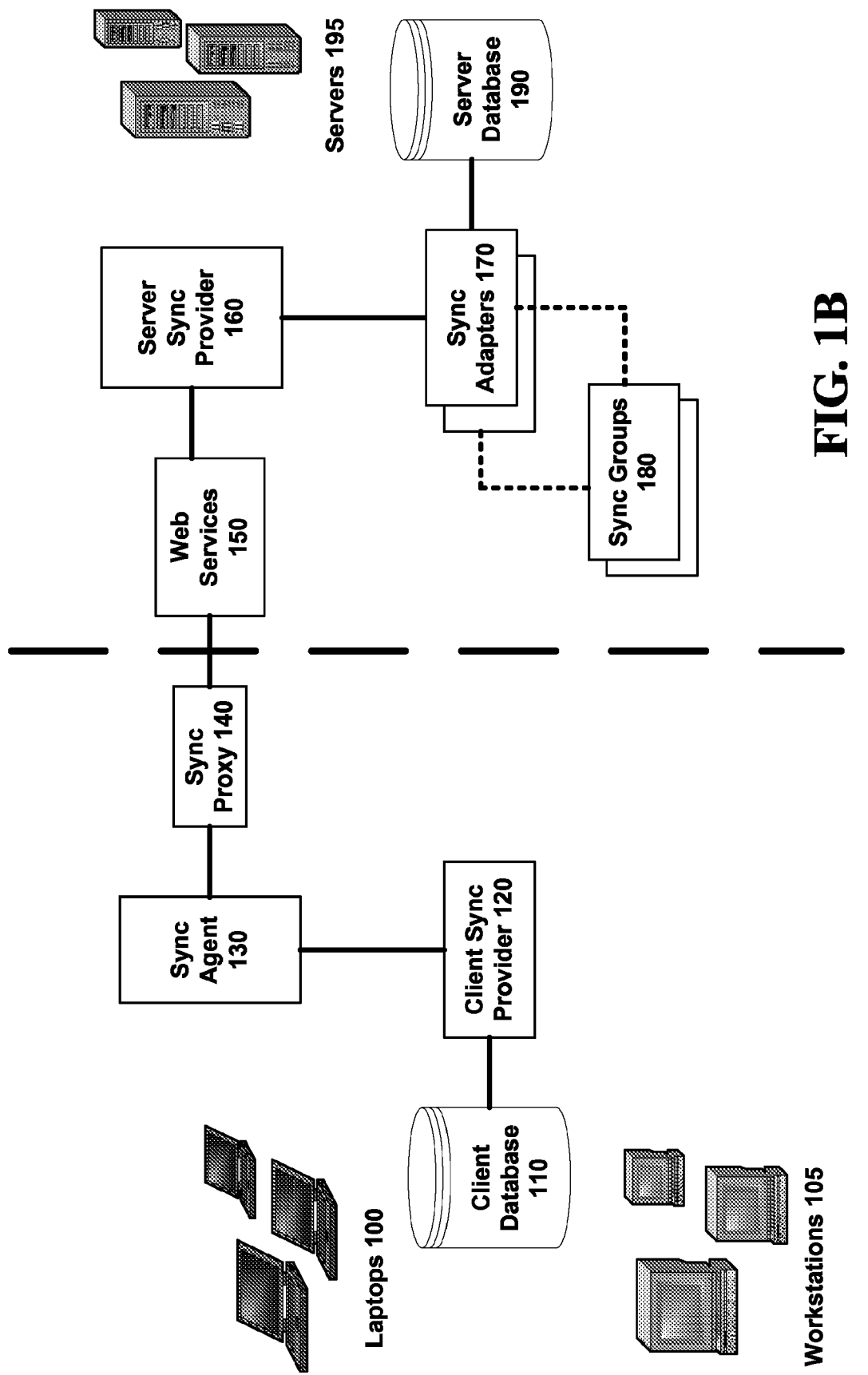

FIG. 1B depicts a more detailed view of the components of the synchronization framework and architecture in accordance with the invention. On the client side, the synchronization framework is orchestrated by sync agent components 130. In this respect, it is noted that a synchronization protocol implemented by the synchronization framework of the invention is transport agnostic. Thus, FIG. 1B depicts but one possible transport implementation using web services 150, but could alternatively be RSS and other transport mechanisms known to those of ordinary skill in the networking arts.

Sync agents 130, located on the client side, are the core sync engine and implement the logic used to: (A) collect metadata from the client and server databases, (B) upload and download changes to and from the server database to the client provider 120 or (C) propagate error, progress and conflict events to the client application. Further, sync agent(s) 130 use sync adapters 170 to interact with the server database 190 through server sync provider interface(s). In addition, each sync adapter 170 defines the table and column mapping for each table being synchronized between client and server along with logical grouping of two or more tables.

The sync agent 130 also accepts a client sync provider 120 and server sync provider 160, which hide the client database 110 and server database 120 specifics, respectively, from the agent 130. The sync agent 130 accepts a collection of sync groups 180 and runs a protocol provided with the framework of the invention in order to bring these groups 180 in sync. Sync adapter 170 instructs the sync agent 130 how to interact with the server database 190. In this regard, sync agent 130 does not interact directly with sync adapters 170, but rather sync agent 130 interacts with the server provider 160, which in turn uses the sync adapters 170 to connect to the database 190. This interaction is defined through one or more of the following database command objects that may be carried out in accordance with non-limiting embodiments of the invention: Insert, Update, Delete, Select Incremental Inserts, Select Incremental Updates, Select Incremental Deletes, Select Update Conflict and/or Select Delete Conflict commands.

The insert command in accordance with the invention is used by the server sync provider 160 to propagate inserts on the client database 110 to the server database 190.

The update command in accordance with the invention is used by the server sync provider 160 to propagate updates on the client database 110 to the server database 190.

The delete command in accordance with the invention is used by the server sync provider 160 to propagate deletes on the client database 110 to the server database 190.

The select incremental inserts command in accordance with the invention is used by the server sync provider 160 to enumerate inserts that took place on the server database 190 since the last time the client database 110 synced.

The select incremental updates command in accordance with the invention is used by the server sync provider 160 to enumerate updates that took place on the server database 190 since the last time the client database 110 synced.

The select incremental deletes command in accordance with the invention is used by the server sync provider 160 to enumerate deletes that took place on the server database 190 since the last time the client database 110 synced.

The select update conflict command in accordance with the invention is used by the server sync provider 160 to obtain the existing row that led to the failure of insert, update or delete commands. This command performs a lookup of the conflicting row in the applicable data table.

The select delete conflict command in accordance with the invention is used by the server sync provider 160 to get hold of the existing row that led to the failure of insert, update or delete commands. In one embodiment, this command performs a lookup of the conflicting row in a tombstone table to find the row in the tombstone table that leads to the failure of the update command, but is not used when insert or delete commands fail.

As part of the synchronization framework of the invention, an off-line application may elect any one or more of the foregoing synchronization behaviors. Some of the embodiments and examples used herein pertain to database storage of data, such as relational storage, though for the avoidance of doubt, the client or server data store can be any kind of data store.

With respect to server sync providers 160 in accordance with the framework of the invention, in one non-limiting embodiment, both default and custom providers 160 are enabled. Default providers 160 are provided to address common application scenarios, e.g., thin client scenario, rich client scenario, SQL Server Compact Edition, SQL Server Express, etc. Application developers and third parties may also implement custom providers 160 for less common scenarios, e.g., Access, FoxPro, Sybase, via a simple framework and helper classes for such custom providers 160.

In various non-limiting embodiments of the invention, functionality of server sync provider 160 includes, but is not limited to: the ability to store sync information for groups 180, the ability to enumerate incremental changes that took place on the database 190 since the last sync, the ability to apply incremental changes to the database 190, the ability to detect conflicting updates and optionally resolve them programmatically or interactively and the ability to fire progress and data change events.

With respect to sync proxy 140, today, solutions that require direct connection to the server database 190 are seen less and less these days as service oriented architecture (SOA) based solutions are growing in popularity. With a SOA model, server 195 exposes its functionality as a web service 150 that connects to the server 195 on demand. Via sync agent 130, the client interacts with the web service 150 through the internet or through a local intranet in an enterprise. The sync proxy component 140 is thus a simple interface that enables building of disconnected SOA solutions, though as emphasized earlier, any transport mechanism for the synchronization framework may be used in accordance with the invention.

Thus, FIG. 1B describes an exemplary non-limiting synchronization framework for applications running on laptops 100 and workstations 105 for each to synchronize with one or more sync groups 180 defined for data in server database 190 as maintained by servers 195.

Figure 2A:
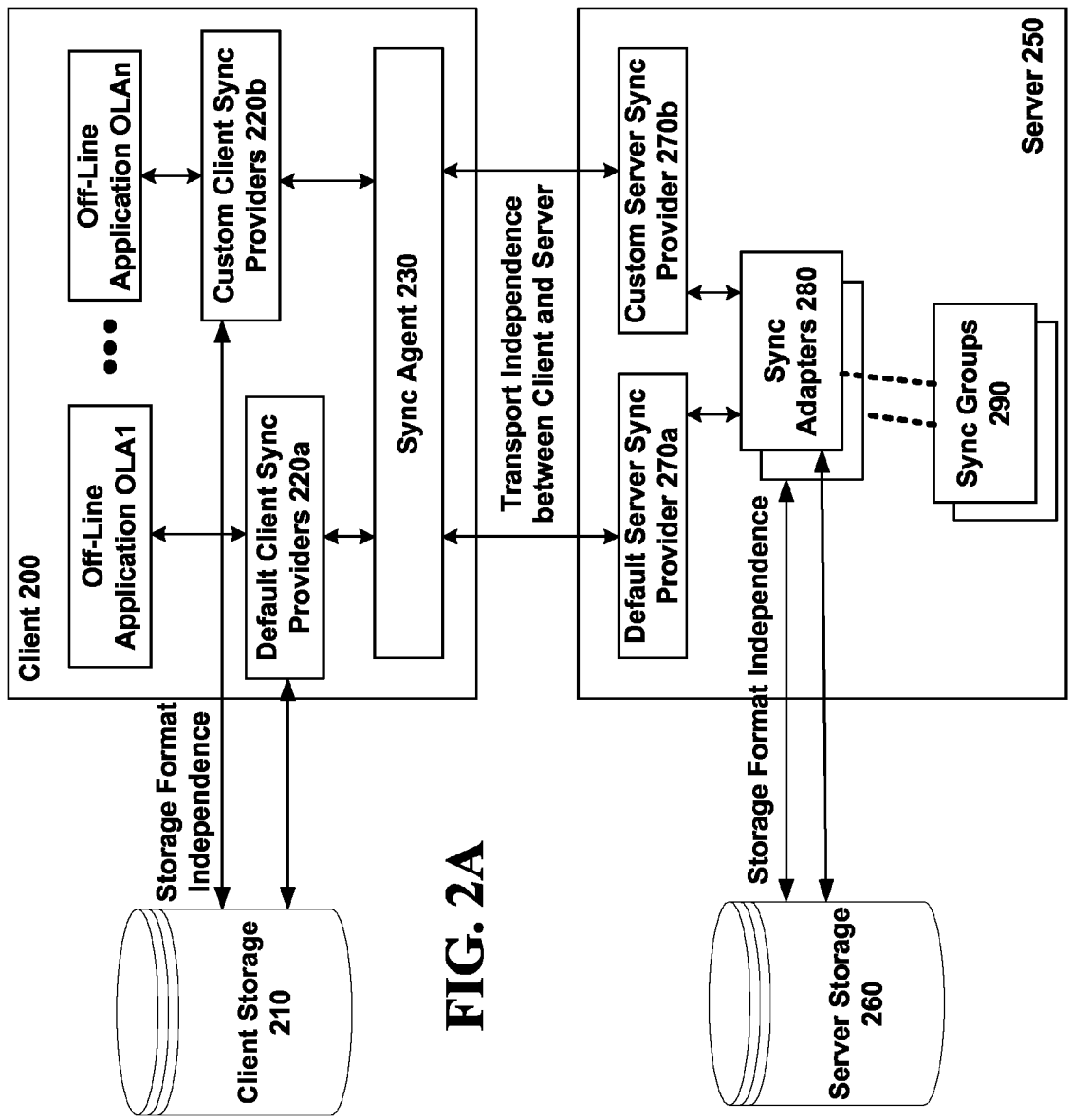
FIGS. 2A, 2B, 2C and 2D are block diagrams of non-limiting implementations of various building blocks provided as part of the framework of the invention.

FIG. 2A is an exemplary non-limiting implementation of the framework of the invention for rapid development of off-line applications OLA1 to OLAn on a client 200 and for synchronizing with data storage 260 of a server 250. In this regard, as with FIG. 1B, storage format independence is enabled with respect to communications within the framework to client storage 210 and server storage 260, and transport independence is enabled between server 250 and client 200.

Advantageously, as mentioned above, offline applications in accordance with the invention can implement custom client sync providers 220*b*, which are customized for a particular off-line application, such as off-line application OLAn, or default client sync providers 220*a*, which cover a variety of common synchronization scenarios that may be desirable for an off-line application, such as off-line application OLA1. As with FIG. 1B, via interfaces of the server sync providers 270*a* or 270*b*, sync agent(s) 230 use sync adapters 280 to interact with the server database 260 synchronizing according to defined sync groups 290. As shown, server sync providers may also be provided as a default server sync provider 270*a* to handle common known sync scenarios from off-line applications OLA1, . . . , OLAn, or may be customized as a custom server sync provider 270*b* to implement additional synchronization requirements. Sync providers 220*a*, 220*b*, 270*a*, 270*b* are thus building blocks of the framework of the invention that help build synchronizing applications quickly and efficiently, particularly for a set of widely anticipated kinds of off-line behavior described in more detail herein.

Figure 2B:
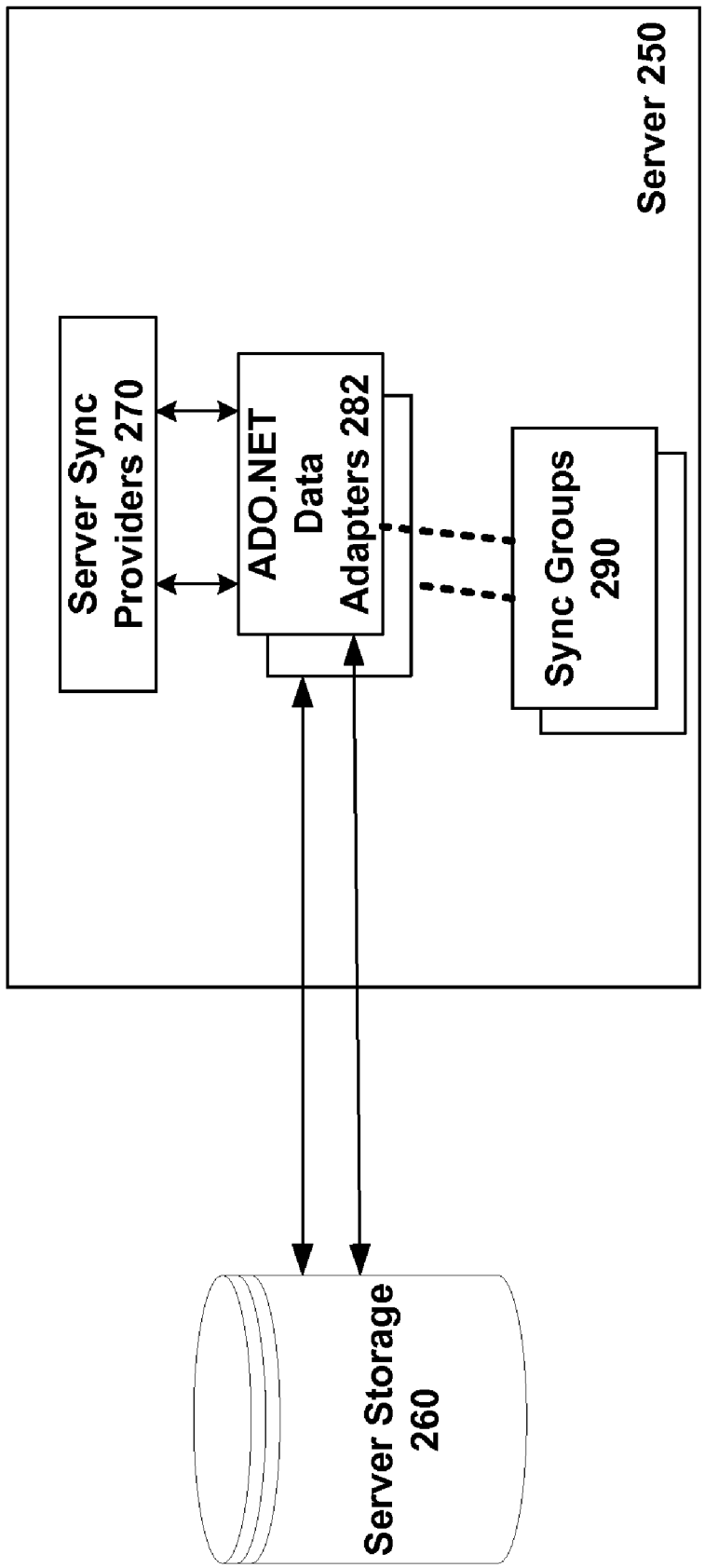

As shown in FIG. 2B, in one non-limiting embodiment, the sync adapter 282 of the invention is implemented similar to Data Adapter in Microsoft ADO.NET by using or extending Data Adapter constructs, though for the avoidance of doubt, the invention is not limited to implementations similar to Data Adapter. As illustrated, server sync providers 270 interface to ADO.NET Data Adapters 282, which communicate with server storage 260 vis-à-vis defined sync groups 290 of server 250. The approach to integrate sync into the ADO.NET programming model enables developers familiar with ADO.NET to build a sync application with minimum learning because the design of the SyncAdapter class is based on the ADO.NET DataAdapter class.

Figure 2C:
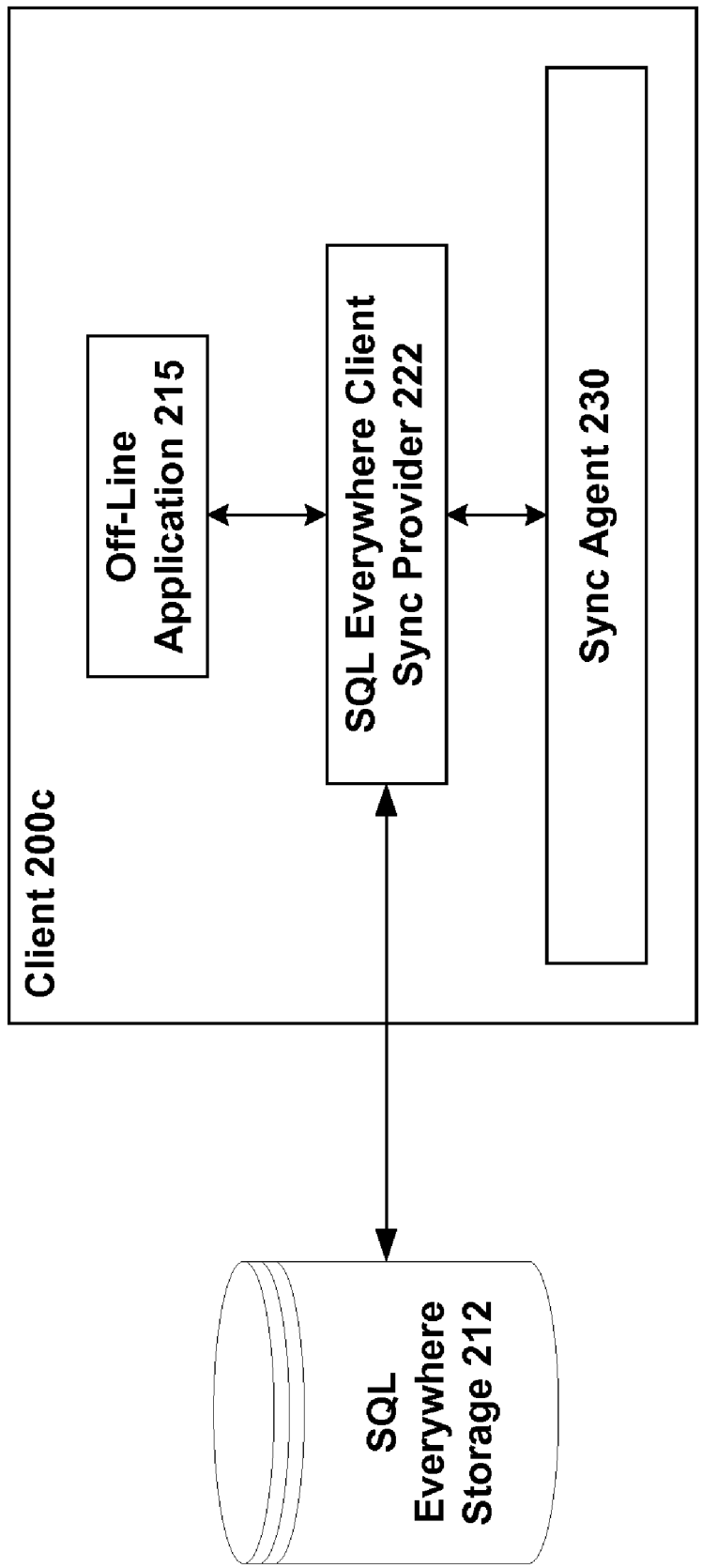
Figure 2D:
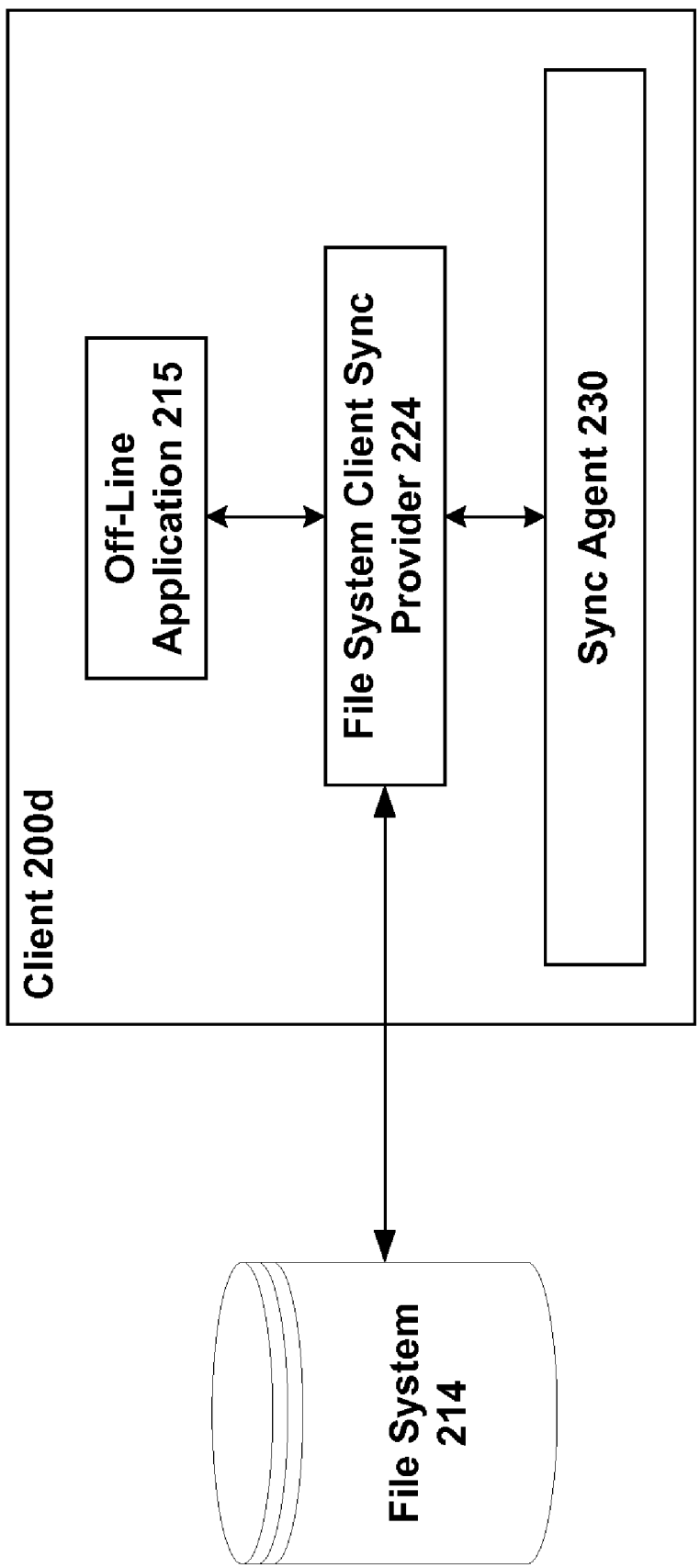

As shown in FIG. 2C, in another non-limiting embodiment, a default client sync provider 222 is enabled for SQL Server Compact Edition clients for interfacing with storage 212, i.e., a SQL Server Compact Edition database, on behalf of offline application 215 on client 200*c*. As shown in FIG. 2D, in another non-limiting embodiment, a default client sync provider 224 is enabled for clients for interfacing with file system storage 214 on behalf of offline application 215 on client 200*d*.

The provider architecture of the framework of the invention thus enables developers to use client and server providers provided in the framework or plug-in a custom provider for more advanced scenarios. The framework of the invention provides building blocks for developers to build occasionally connected applications, e.g., for a "pay as you go" experience. In this regard, the framework has the components to build the simple solutions very quickly and it has the full flexibility to build complex solutions using the building blocks.

Figure 3A:
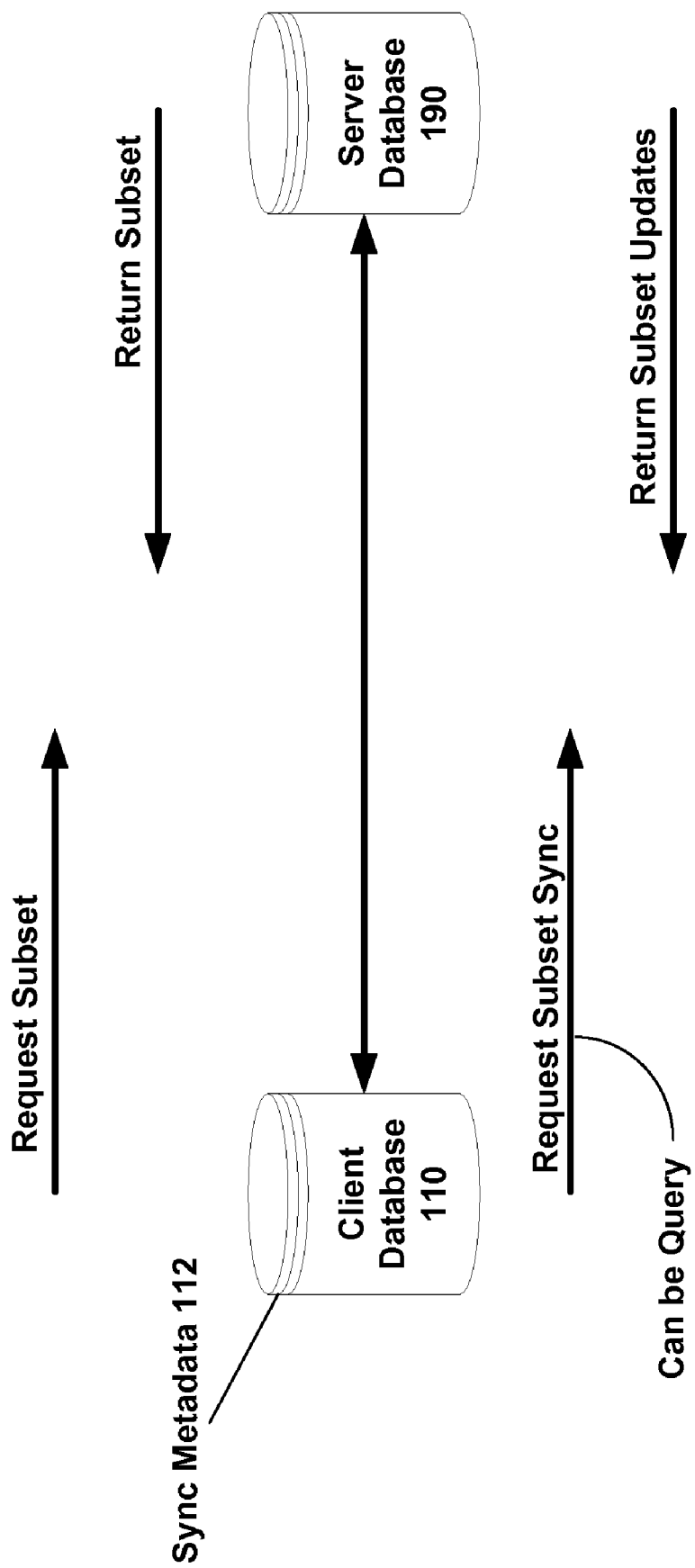
FIGS. 3A, 3B, 3C and 3D are flow diagrams illustrating exemplary, non-limiting implementations of various synchronization scenarios in accordance with the framework of the invention.

A variety of default scenarios are enabled by the synchronization framework for off-line applications in accordance with the invention. FIG. 3A illustrates a first scenarios enabled by the framework of the invention that advantageously allows a subset of data to be specified and retrieved by a client database 110 for use by an application, which may go offline, and also to synchronize only the subset of data against the server database 190 when on-line. For instance, this would allow an e-mail application only interested in recent email to retrieve and receive synchronization updates only for recent email as defined by the application. As part of a request, which may be a query, for a subset of data from server database 190 from an application of the client, the server database 190 in turn returns the subset of data according to the above-described framework architecture.

FIG. 3A also illustrates that sync metadata 112 is represented on the client side in accordance with the invention enabling scalability by freeing the server side from maintaining sync metadata about all of its clients. In this respect, the framework of the invention enables synchronizing with pre-existing servers without need for any additional provisioning on the server side.

In accordance with the invention, the application may also then go off-line and operate with respect to only the subset of data returned, and then upon becoming connected again, the client can request synchronization updates with respect to the subset of data on the client, or request synchronization of a new subset of data. In either case, the server returns the requested updates or new subset data according to the synchronization framework.

Figure 3B:
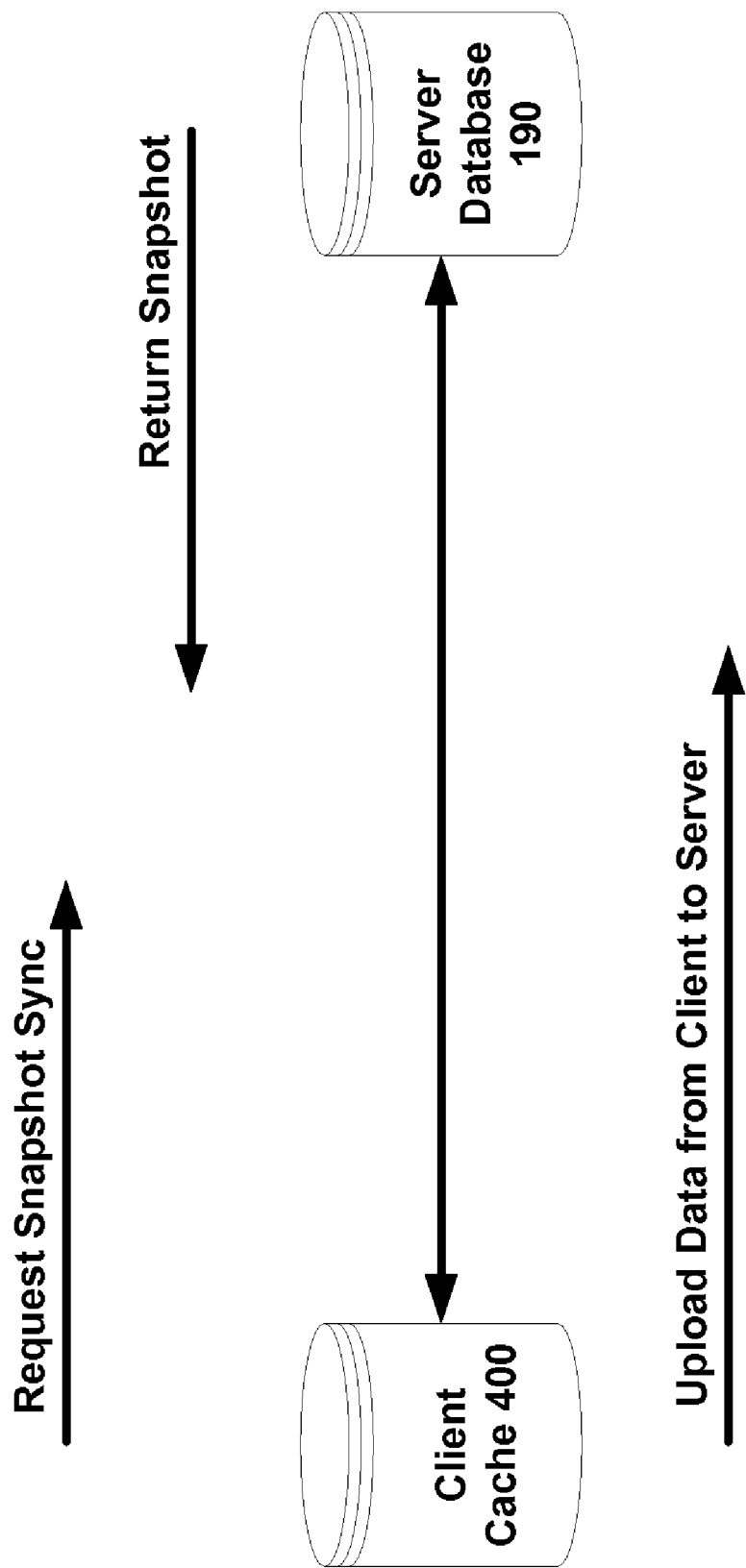

FIG. 3B illustrates that a client cache 400 may be implemented so that the off-line application has fast access to data in the cache 400 while off-line. In addition, FIG. 3B illustrates that another scenario that is enabled is a snapshot synchronization where the client requests and receives a snapshot of a subset of data of server database 190, which is then stored in a read-only cache, such as cache 400, of data on client. The invention also optionally enables incremental download sync, where a read-only cache, such as cache 400, on the client is provisioned with incremental sync capabilities to keep cache 400 up-to-date when it is on-line. Also, as illustrated, the invention enables store and forward capabilities from the client to server, i.e., an upload only sync.

Figure 3C:
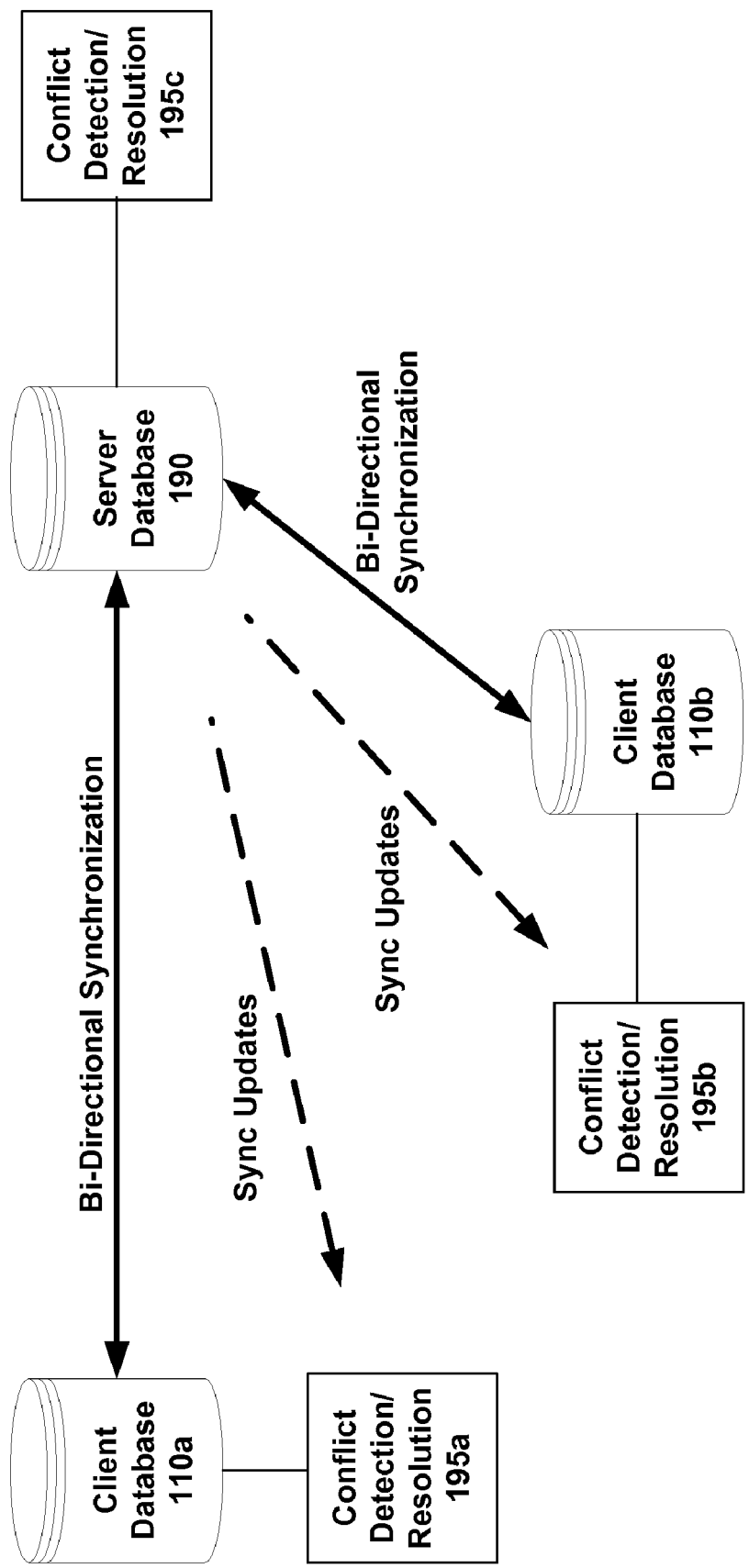

As shown by FIG. 3C, the invention also enables a read-write client cache of data on client, providing bidirectional sync capabilities. Optionally, the bidirectional sync capabilities include a framework to support conflict detection and resolution when multiple clients change the same data. For instance, conflict resolution 195*c* can be performed at the server when two different client databases 110*a*, 110*b* sync with the server database 190 with different, or conflicting, data. This ensures that consistent data is pushed down to the clients 110*a*, 110*b*. Alternatively, each of the clients can be provisioned with conflict resolution mechanisms 195*a*, 195*b* to reflect local application policy for resolving conflicts.

Figure 3D:
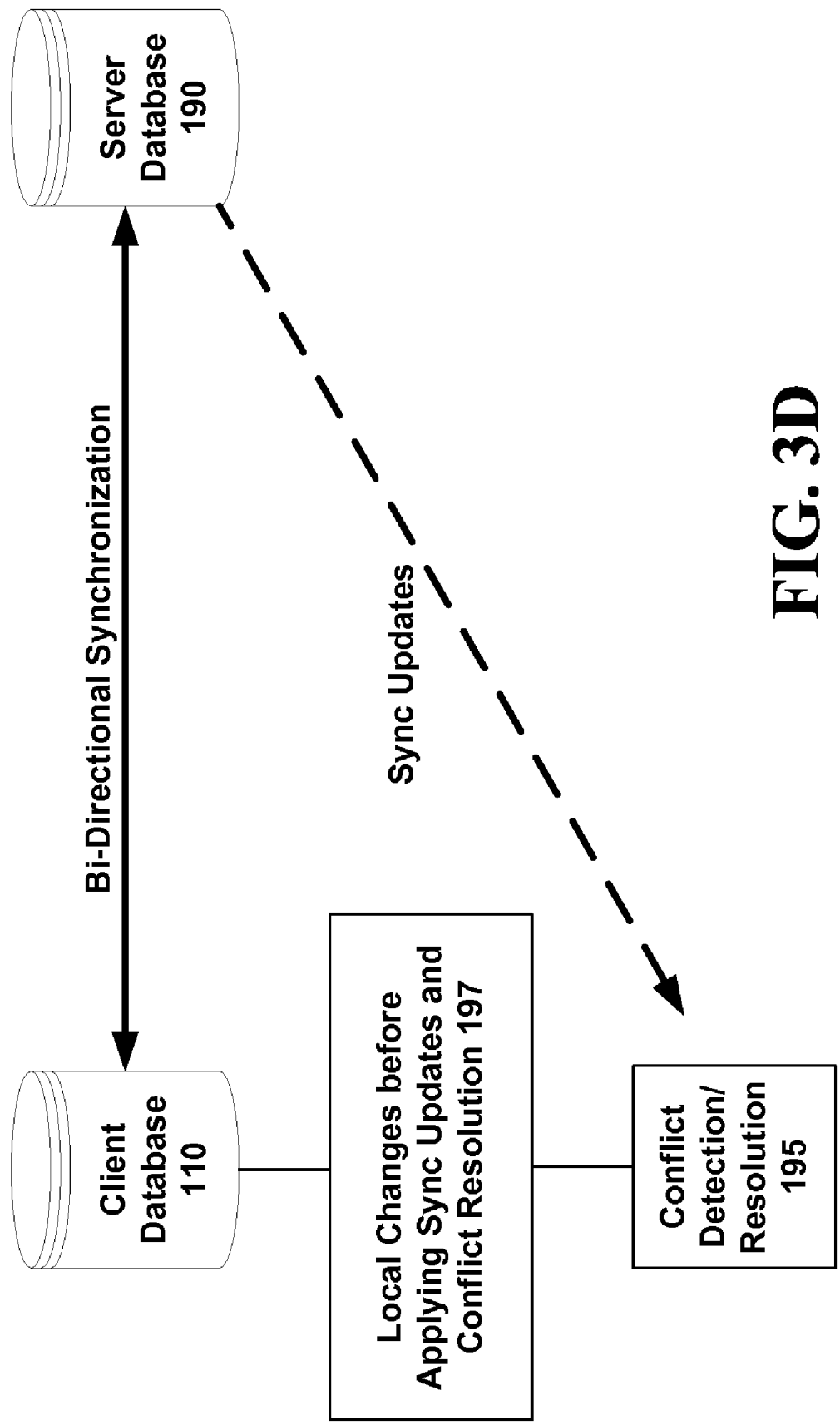

In addition, as shown in FIG. 3D, for a bi-directional synchronization where a conflict is discovered in the data due to independent evolution of data on different devices, wherever conflict resolution 195 is handled according to conflict resolution policy, either at the client database 110 and/or server database 190, the invention enables the ability to make local changes to the data before sync updates are applied, e.g., to override a conflict resolution applied by conflict detection/resolution component 195.

In various non-limiting embodiments, the framework of the invention thus provides the ability to plug in custom change tracking on a data store. For instance, a user may only want to track changes to an email inbox, but not to archived folders. Or for certain data, such as medical records, versioning will be very important, while for other files such as an image archive, versioning will not be important, and thus change tracking might be disabled for the latter groups, and only the subset of data for which versioning is desirable at the client database will have change tracking enabled.

Figure 4:
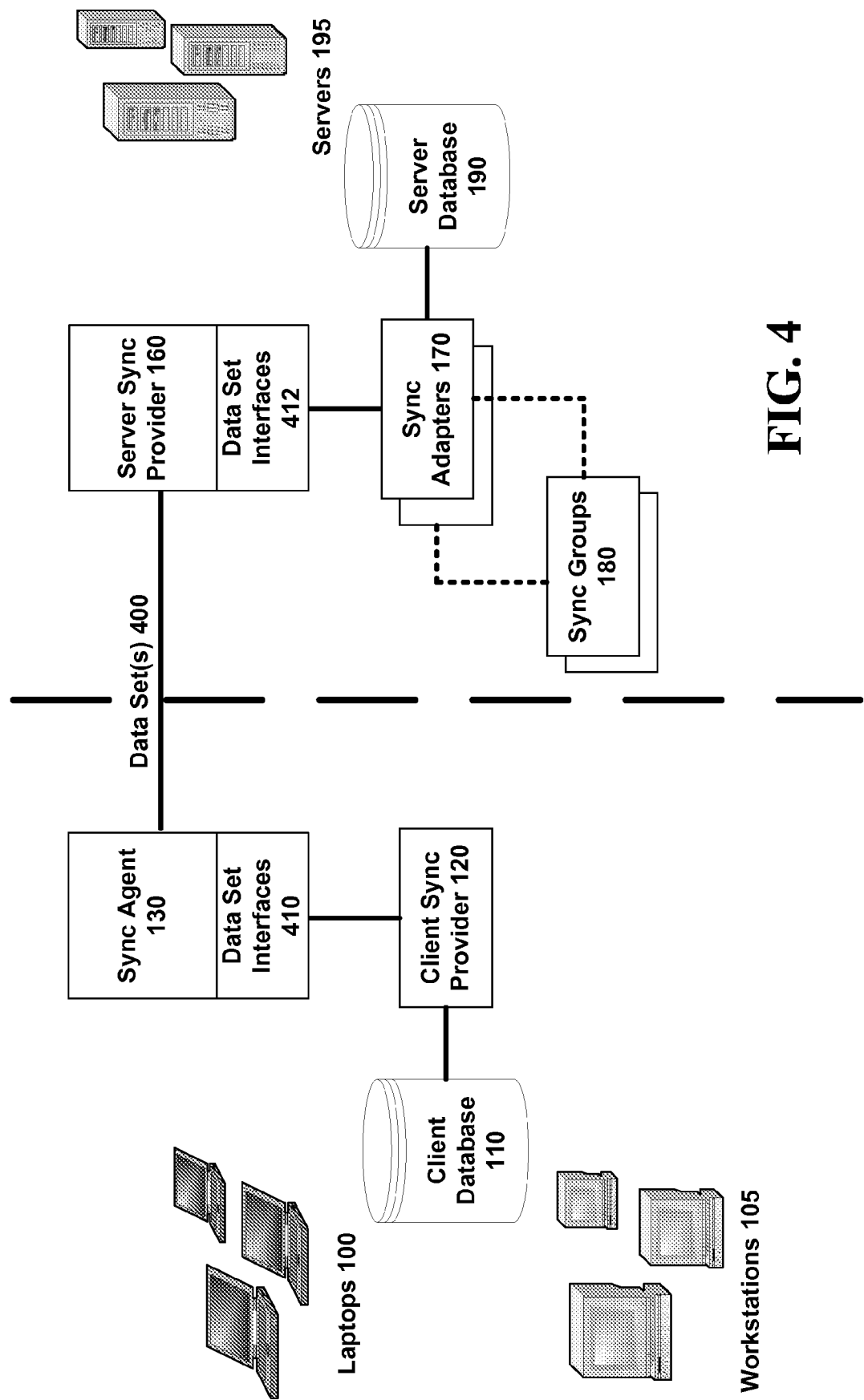
FIGS. 4 and 5 illustrate exemplary non-limiting Data Set implementations for the passing data structures back and forth between client and server without a priori knowledge of client or server side storage structures in accordance with the framework of the invention.
Figure 5:
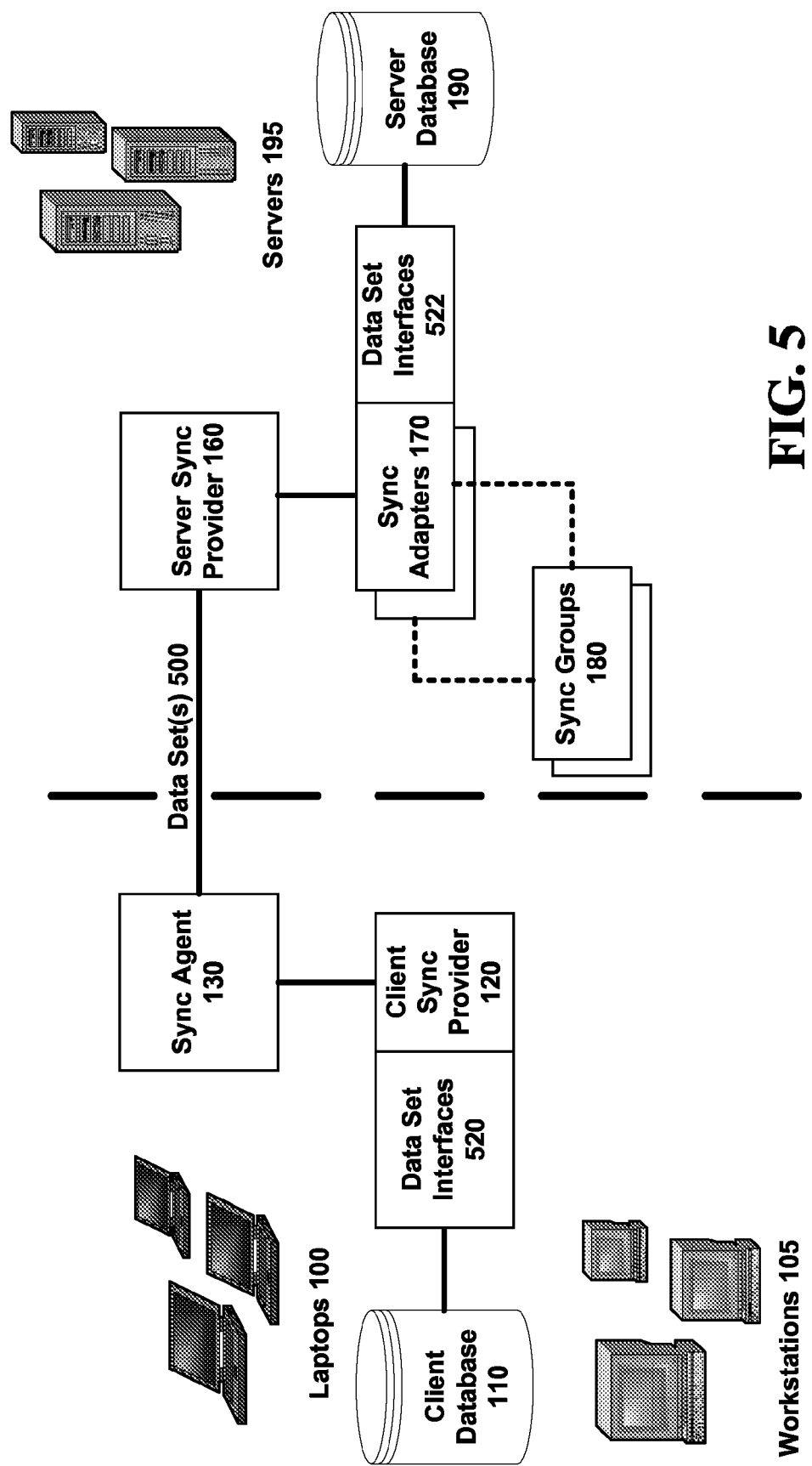

FIG. 4 illustrates an exemplary embodiment of the invention where Data Set data structures 400 (i.e., ADO.NET V2 DataSet objects) are passed between a client side sync agent 130 and a server side sync provider 160. Data Set interfaces 410 are provided on the client side to translate to and from Data Set data structures 400 and Data Set interfaces 412 are provided on the server side to translate to and from Data Set data structures 400. Alternatively, as shown in FIG. 5, Data Set Interfaces 520 and 522 on the client side and server side, respectively, can be utilized to translate to and from Data Set data structures 500 in connection with client database 110 and server database 190, respectively. For the avoidance of doubt, the foregoing Data Set implementations are non-limiting and thus, other data structures may be utilized to represent synchronization data to and from clients and servers in accordance with the invention, along with the appropriate interfaces. Whatever implementation selected, the framework of the invention is thus able to operate in a transport independent manner without needing to know the exact format of data storage for either the client or server sides.

Figure 6:
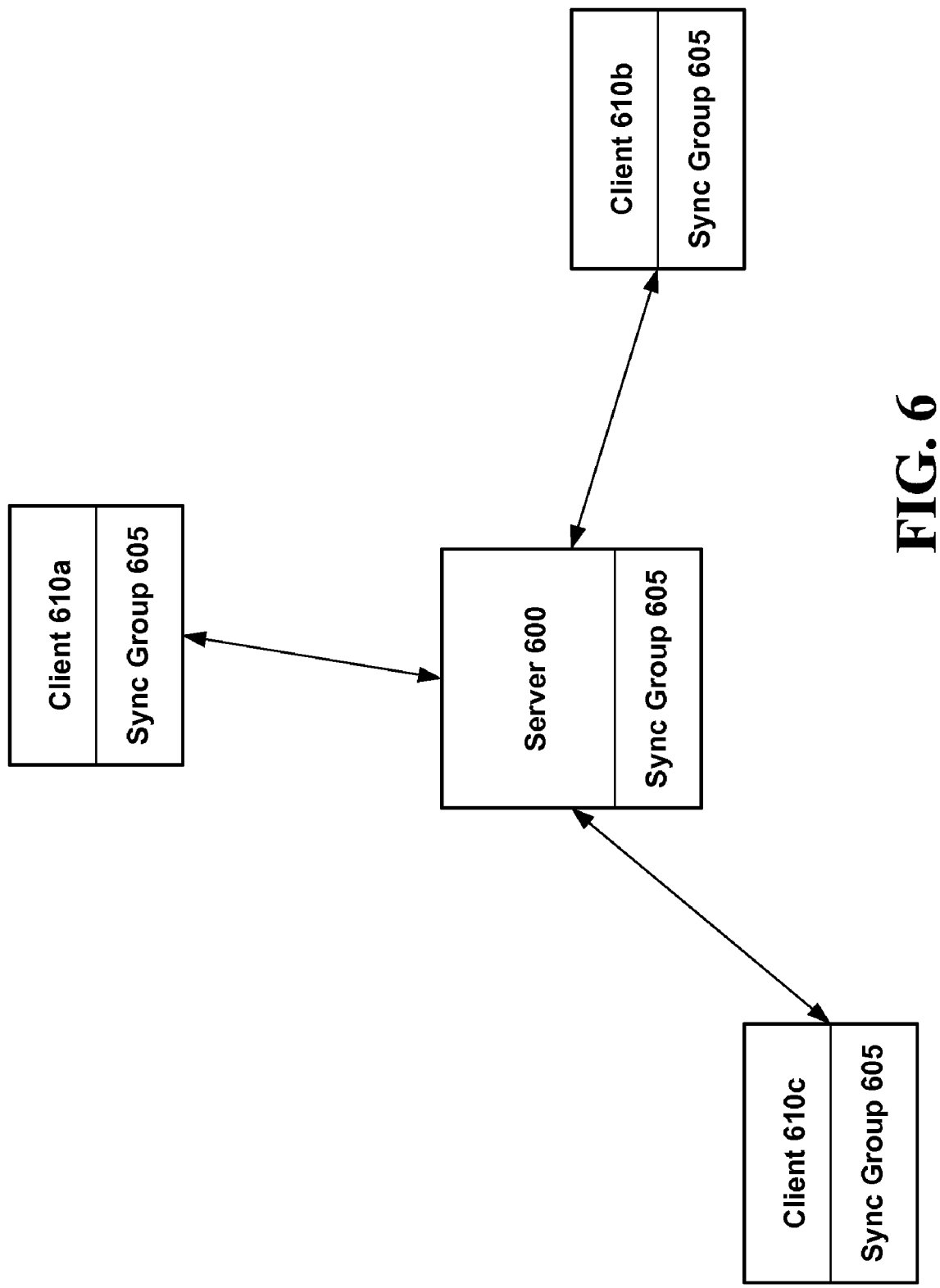
FIG. 6 illustrates the scalability of the synchronization framework of the invention to many clients, for example, as part of a hub and spoke synchronization model.

Advantageously, since client metadata is stored on a client, as shown in FIG. 6, the synchronization framework of the invention can be used to synchronize data according to a hub and spoke model where clients 610a, 610b, 610c, etc. can come into contact with a server 600 and each synchronize with the data of sync group 605. Based on temporal properties, such as timestamps, of the data being synchronized and according to conflict resolution policy, a consistent set of data of sync group 605 can be maintained at server 600 and at clients 610a, 610b, 610c whenever the clients come into contact with the server.

Figure 7A:
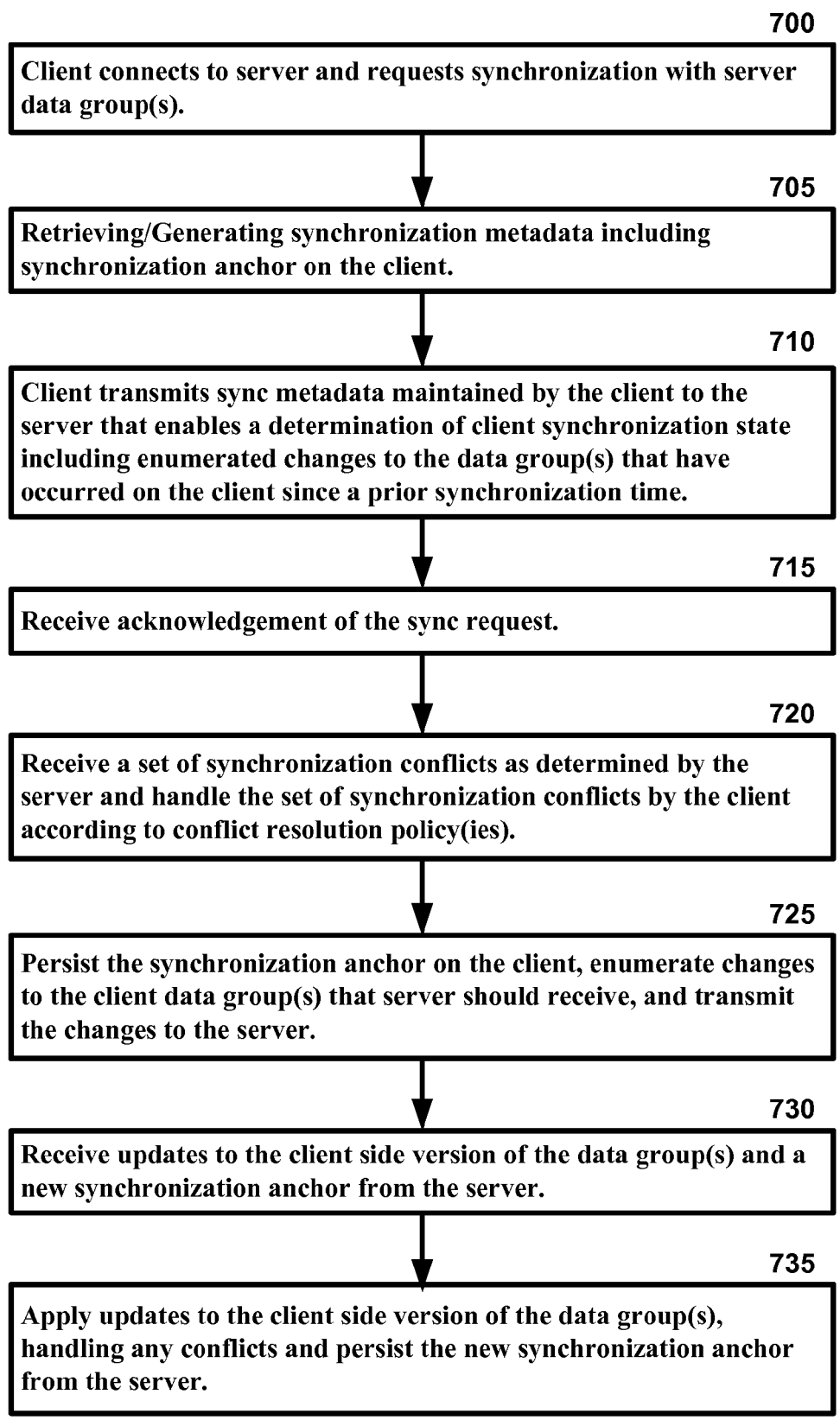
FIGS. 7A and 7B are flow diagrams implementing an exemplary non-limiting process for synchronization from the perspective of a client and a server, respectively, of the invention.

FIG. 7A is a flow diagram implementing an exemplary non-limiting process for synchronization using the framework of the invention from the perspective of a client. At 700, a client connects to a server and requests synchronization with a selected set of server data group(s). At 705, synchronization metadata is generated or retrieved by the client including a client synchronization anchor. At 710, the client transmits the synchronization metadata maintained by the client to the server. As mentioned, the synchronization metadata maintained by the client enables a determination by the server of client synchronization state including enumerated changes to the data group(s) that have occurred on the client since a prior synchronization time. At 715, the client receives acknowledgement of the sync request from the server.

At 720, optionally, a set of synchronization conflicts, where data has independently been changed in separate locations, as determined by the server are received by the client. The client optionally handles the set of synchronization conflicts according to various selected conflict resolution policy(ies). At 725, assuming receipt of the acknowledgment from the server, the synchronization anchor is persisted on the client. Also, an analysis of local changes to the data group(s) ensues and any changes to the client data group(s) that should be sent to the server are then transmitted to the server. At 730, in a corresponding manner, the client then receives from the server the desired updates to the client side version of the data group(s). The client then receives a new synchronization anchor generated by the server, but then maintained by the client for future synchronization requests.

Apply updates to the client side version of the data group(s), handling any conflicts and persist the new synchronization anchor from the server.

Figure 7B:
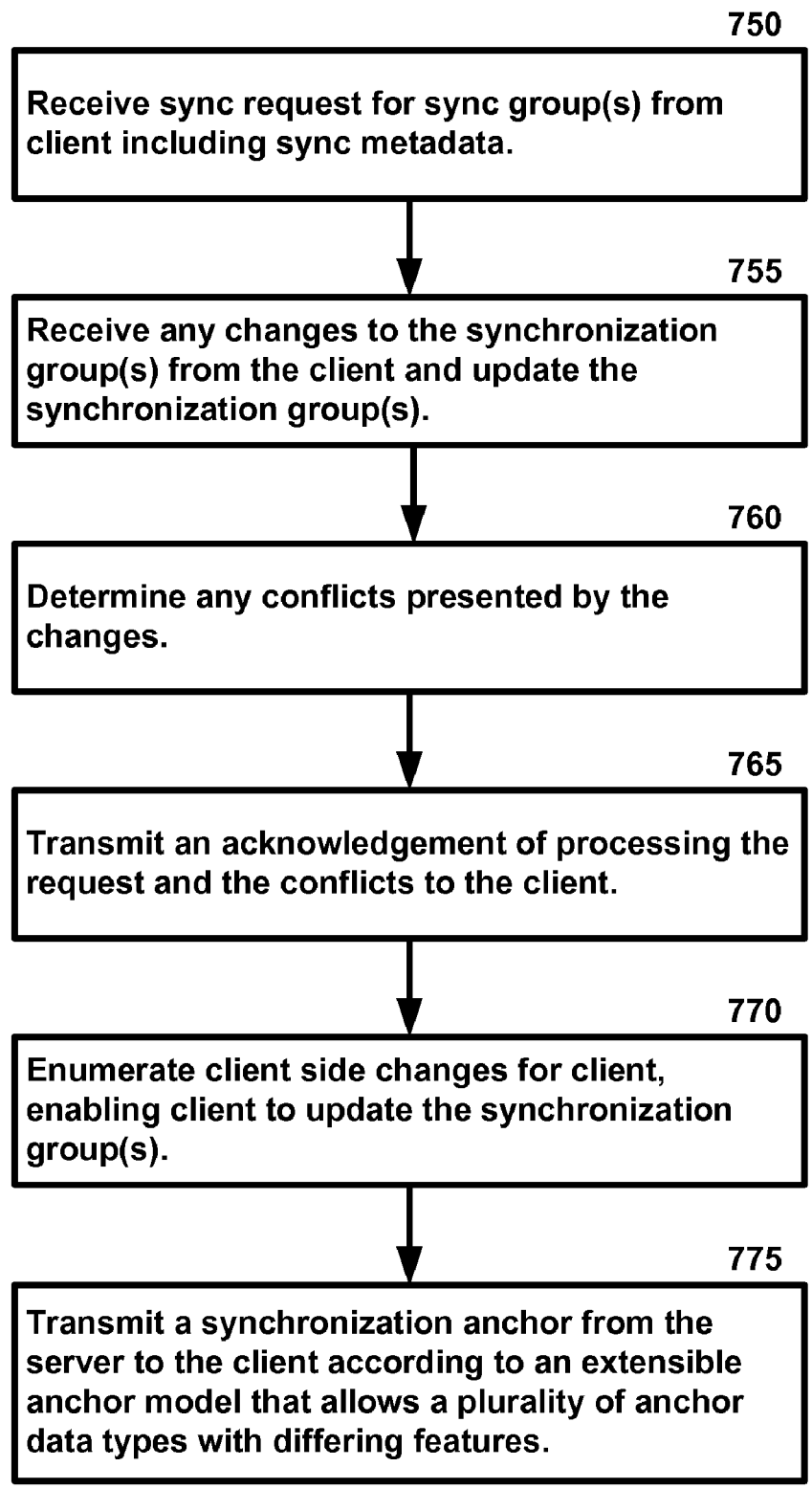

FIG. 7B is a flow diagram implementing an exemplary non-limiting process for synchronization from the perspective of a server of the invention. At 750, a sync request is received for sync group(s) from a client including sync metadata. At 755, any changes to the synchronization groups(s) are received from the client and the synchronization group(s) are updated. At 760, any conflicts presented by the changes are determined. At 765, an acknowledgement of processing the request and the conflicts are sent to the client. At 770, client side changes are enumerated for the client, enabling the client to update the synchronization group(s). At 775, a synchronization anchor from the server is transmitted to the client according to an extensible anchor model that allows a plurality of anchor data types with differing features.

Figure 8:
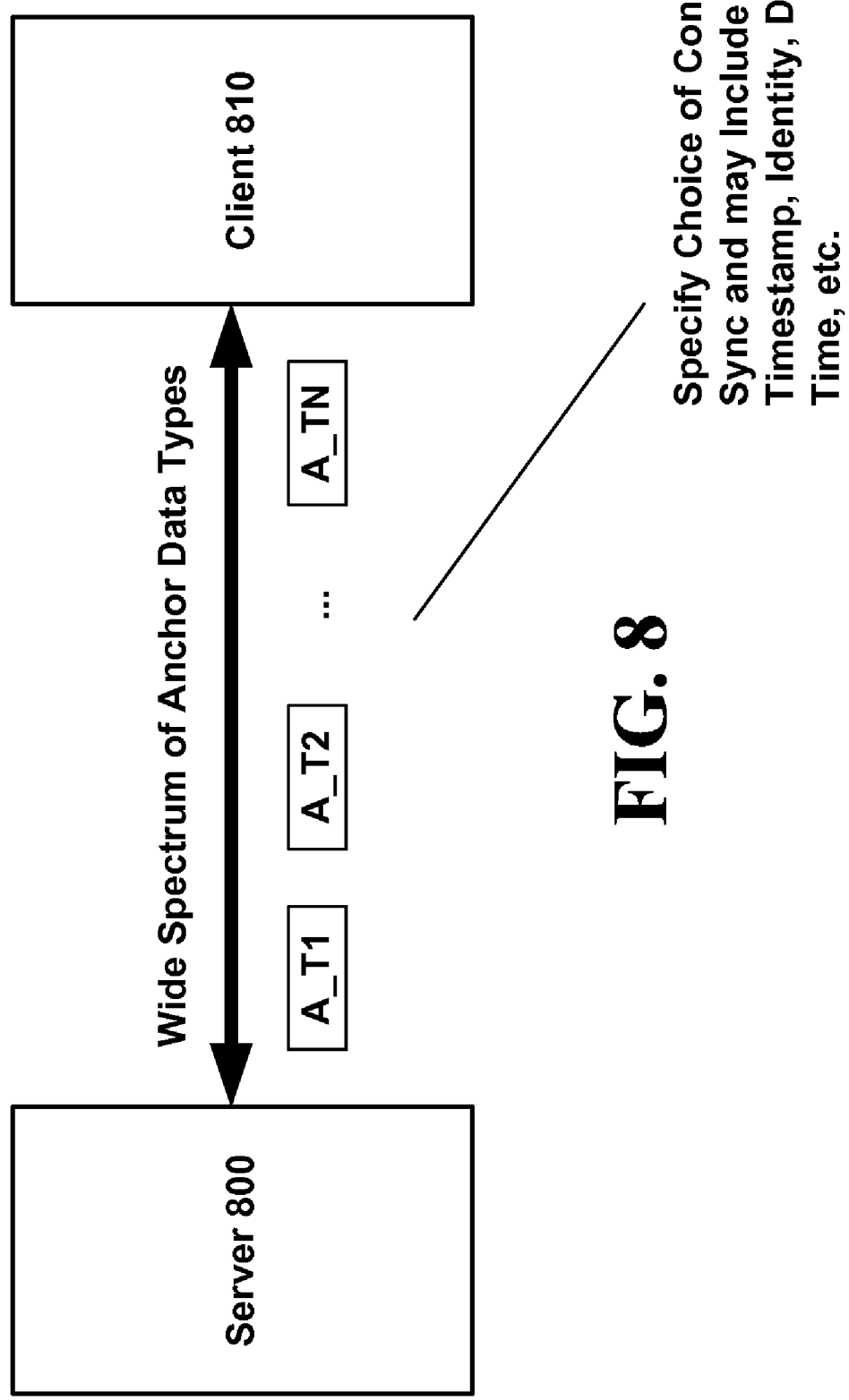
FIG. 8 is a block diagram illustrating exemplary aspects of an extensible synchronization anchor model of the invention.

In further non-limiting embodiments, the invention enables an extensible sync anchor model by providing a protocol that carries an anchor type between client and server, but does not assume any pre-defined structure on the client and thus flexibly allows a wide spectrum of anchor data types with varying level of features. FIG. 8 illustrates that a variety of anchor types A_T1, A_T2, . . . , A_TN can be passed back and forth between a server 800 and a client 810 in accordance with the protocol of the invention. In addition, the structure of the anchor is defined by the server and advantageously, the client does not need to understand the format in order to sync with the server. Anchors thus provide local "hooks" for synchronization of specified data among devices and generally includes a temporal watermark of some sort, such as a Timestamp, Identity, Date/Time, etc. so that the hooks have a time dimension that can be analyzed during synchronization analysis and conflict resolution.

Exemplary Networked and Distributed Environments

One of ordinary skill in the art can appreciate that the invention can be implemented in connection with any computer or other client or server device, which can be deployed as part of a computer network, or in a distributed computing environment, connected to any kind of data store. In this regard, the present invention pertains to any computer system or environment having any number of memory or storage units, and any number of applications and processes occurring across any number of storage units or volumes, which may be used in connection with the synchronization framework of the present invention. The present invention may apply to an environment with server computers and client computers deployed in a network environment or a distributed computing environment, having remote or local storage. The present invention may also be applied to standalone computing devices, having programming language functionality, interpretation and execution capabilities for generating, receiving and transmitting information in connection with remote or local services and processes.

Distributed computing provides sharing of computer resources and services by exchange between computing devices and systems. These resources and services include the exchange of information, cache storage and disk storage for objects, such as files. Distributed computing takes advantage of network connectivity, allowing clients to leverage their collective power to benefit the entire enterprise. In this regard, a variety of devices may have applications, objects or resources that may function as components of the synchronization framework of the invention.

Figure 9:
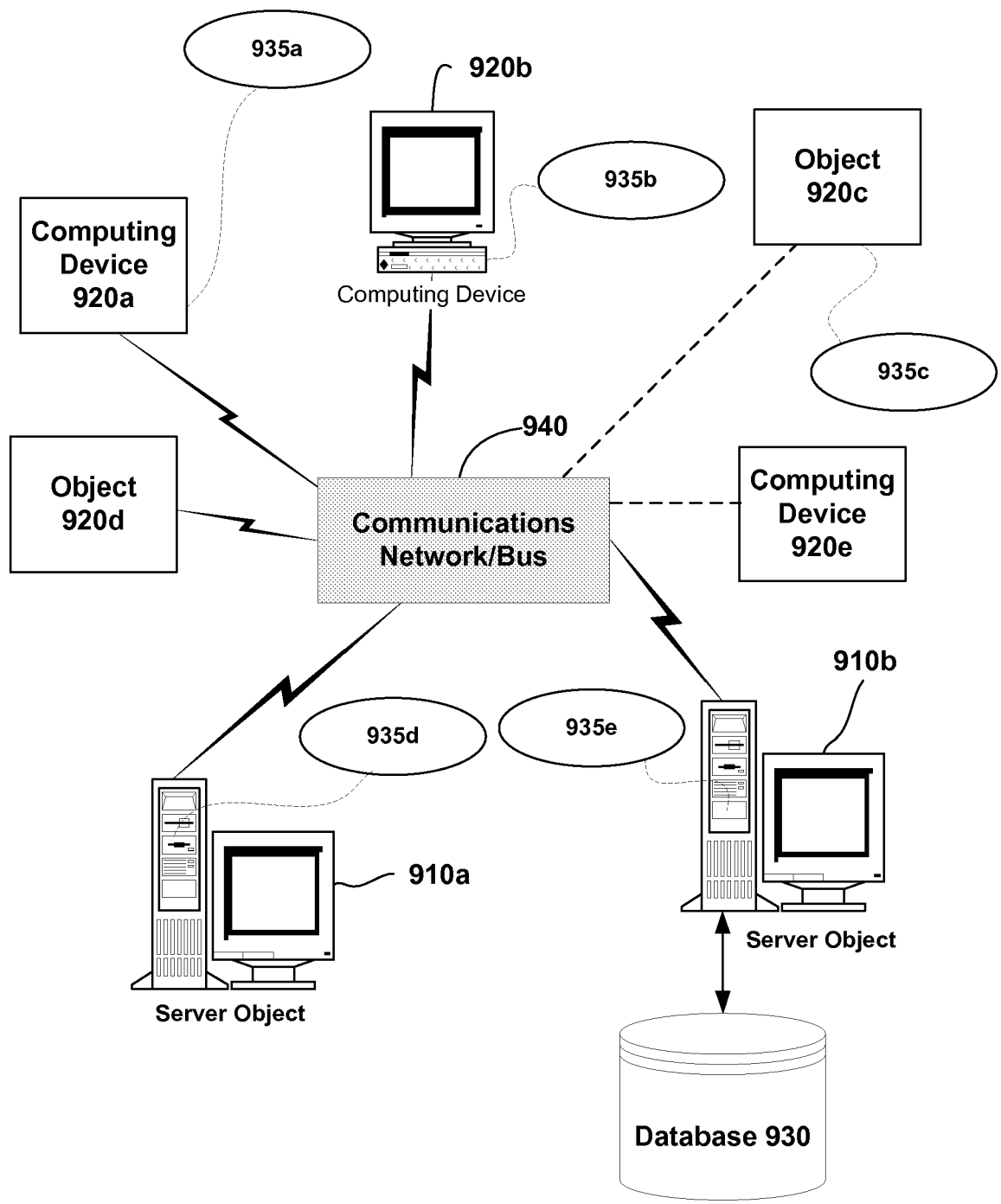
FIG. 9 is a block diagram representing an exemplary non-limiting networked environment in which the present invention may be implemented.

FIG. 9 provides a schematic diagram of an exemplary networked or distributed computing environment. The distributed computing environment comprises computing objects 910a, 910b, etc. and computing objects or devices 920a, 920b, 920c, 920d, 920e, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 940. This network may itself comprise other computing objects and computing devices that provide services to the system of FIG. 9, and may itself represent multiple interconnected networks. In accordance with an aspect of the invention, each object 910a, 910b, etc. or 920a, 920b, 920c, 920d, 920e, etc. may contain an application that might make use of an API, or other object, software, firmware and/or hardware, suitable for use with the systems and methods for synchronizing data groups in accordance with the invention.

It can also be appreciated that an object, such as 920c, may be hosted on another computing device 910a, 910b, etc. or

920a, 920b, 920c, 920d, 920e, etc. Thus, although the physical environment depicted may show the connected devices as computers, such illustration is merely exemplary and the physical environment may alternatively be depicted or described comprising various digital devices such as PDAs, televisions, MP3 players, etc., any of which may employ a variety of wired and wireless services, software objects such as interfaces, COM objects, and the like.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the synchronization framework of the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge, or already have emerged, as protocol standards may be interconnected to form a network, such as an intranet, that may be connected to the outside world by way of a wide area network, such as the Internet. In short, a variety of disparate sources exist for the storage and transmission of data, and consequently, any of the computing devices of the present invention may share and communicate data in any existing manner, and no one way described in the embodiments herein is intended to be limiting.

The Internet commonly refers to the collection of networks and gateways that utilize the Transmission Control Protocol/Internet Protocol (TCP/IP) suite of protocols, which are well-known in the art of computer networking. The Internet can be described as a system of geographically distributed remote computer networks interconnected by computers executing networking protocols that allow users to interact and share information over network(s). Because of such wide-spread information sharing, remote networks such as the Internet have thus far generally evolved into an open system with which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the illustration of FIG. 9, as an example, computers 920a, 920b, 920c, 920d, 920e, etc. can be thought of as clients and computers 910a, 910b, etc. can be thought of as servers where servers 910a, 910b, etc. maintain the data that is then synchronized or replicated to client computers 920a, 920b, 920c, 920d, 920e, etc., although any computer can be considered a client, a server, or both, depending on the circumstances. Any of these computing devices may be processing data or requesting services or tasks that may implicate the synchronization framework in accordance with the invention.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques for synchronizing data groups of the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 9 illustrates an exemplary networked or distributed environment, with server(s) in communication with client computer (s) via a network/bus, in which the present invention may be employed. In more detail, a number of servers 910a, 910b, etc. are interconnected via a communications network/bus 940, which may be a LAN, WAN, intranet, GSM network, the Internet, etc., with a number of client or remote computing devices 920a, 920b, 920c, 920d, 920e, etc., such as a portable computer, handheld computer, thin client, networked appliance, or other device, such as a VCR, TV, oven, light, heater and the like in accordance with the present invention. It is thus contemplated that the present invention may apply to any computing device in connection with which it is desirable to synchronize data.

In a network environment in which the communications network/bus 940 is the Internet, for example, the servers 910a, 910b, etc. can be Web servers with which the clients 920a, 920b, 920c, 920d, 920e, etc. communicate via any of a number of known protocols such as HTTP. Servers 910a, 910b, etc. may also serve as clients 920a, 920b, 920c, 920d, 920e, etc., as may be characteristic of a distributed computing environment.

As mentioned, communications may be wired or wireless, or a combination, where appropriate. Client devices 920a, 920b, 920c, 920d, 920e, etc. may or may not communicate via communications network/bus 14, and may have independent communications associated therewith. For example, in the case of a TV or VCR, there may or may not be a networked aspect to the control thereof. Each client computer 920a, 920b, 920c, 920d, 920e, etc. and server computer 910a, 910b, etc. may be equipped with various application program modules or objects 135*a*, 135*b*, 135*c*, etc. and with connections or access to various types of storage elements or objects, across which files or data streams may be stored or to which portion(s) of files or data streams may be downloaded, transmitted or migrated. Any one or more of computers 910*a*, 910*b*, 920*a*, 920*b*, 920*c*, 920*d*, 920*e*, etc. may be responsible for the maintenance and updating of a database 930 or other storage element, such as a database or memory 930 for storing data processed or saved according to the invention. Thus, the present invention can be utilized in a computer network environment having client computers 920*a*, 920*b*, 920*c*, 920*d*, 920*e*, etc. that can access and interact with a computer network/bus 940 and server computers 910*a*, 910*b*, etc. that may interact with client computers 920*a*, 920*b*, 920*c*, 920*d*, 920*e*, etc. and other like devices, and databases 930.

Exemplary Computing Device

Figure 10:
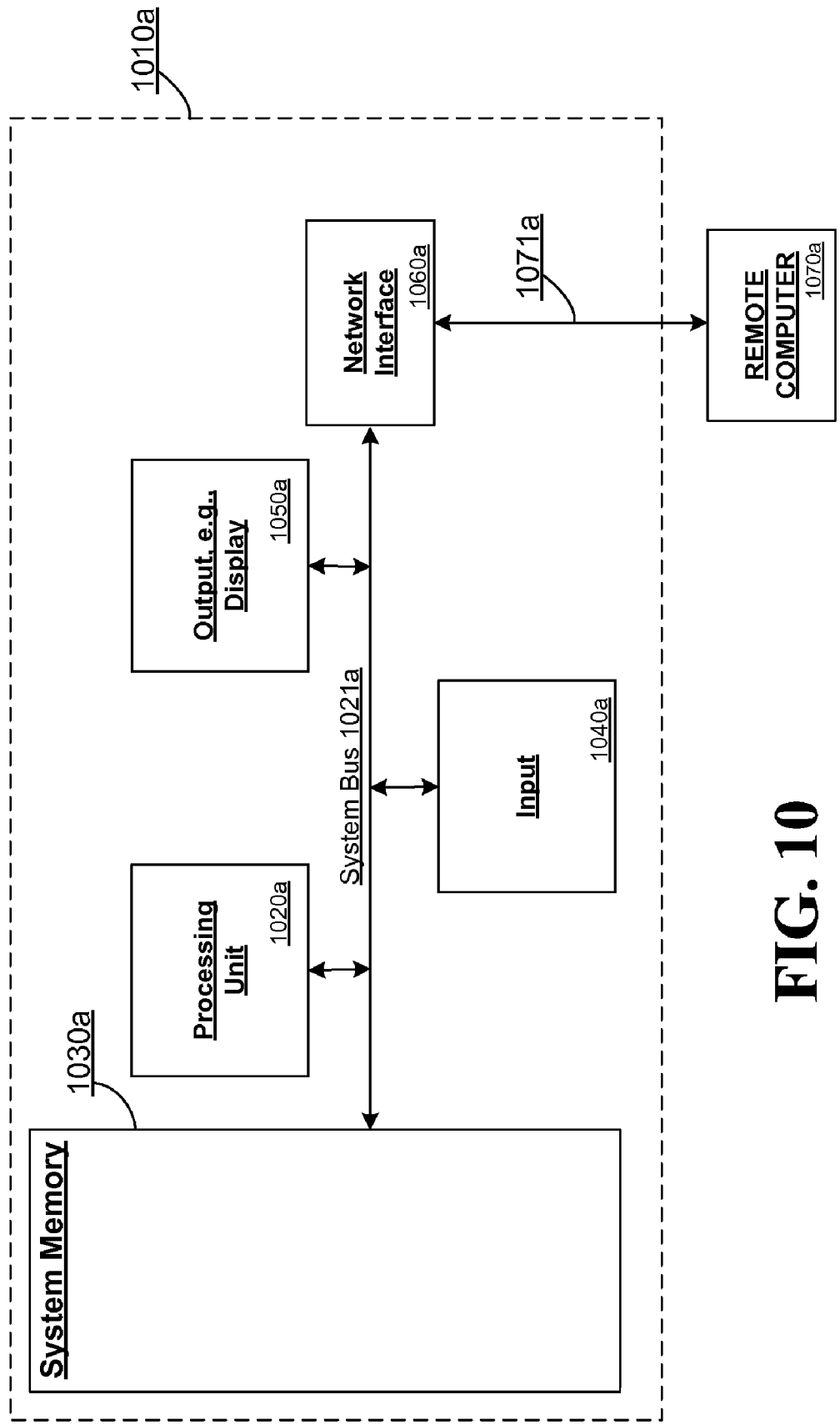
FIG. 10 is a block diagram representing an exemplary non-limiting computing system or operating environment in which the present invention may be implemented.

As mentioned, the invention applies to any device wherein it may be desirable to synchronize data. It should be understood, therefore, that handheld, portable and other computing devices and computing objects of all kinds are contemplated for use in connection with the present invention, i.e., anywhere that a device may synchronize data or otherwise receive, process or store data. Accordingly, the below general purpose remote computer described below in FIG. 10 is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 10 thus illustrates an example of a suitable computing system environment 1000*a* in which the invention may be implemented, although as made clear above, the computing system environment 1000*a* is only one example of a suitable computing environment for a media device and is not intended to suggest any limitation as to the scope of use or functionality of the invention. Neither should the computing environment 1000*a* be interpreted as having any dependency or requirement relating to any one or combination of components illustrated in the exemplary operating environment 1000*a*.

With reference to FIG. 10, an exemplary remote device for implementing the invention includes a general purpose computing device in the form of a computer 1010*a*. Components of computer 1010*a* may include, but are not limited to, a processing unit 1020*a*, a system memory 1030*a*, and a system bus 1021*a* that couples various system components including the system memory to the processing unit 1020*a*. The system bus 1021*a* may be any of several types of bus structures including a memory bus or memory controller, a peripheral bus, and a local bus using any of a variety of bus architectures.

Computer 1010*a* typically includes a variety of computer readable media. Computer readable media can be any available media that can be accessed by computer 1010*a*. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1010*a*. Communication media typically embodies computer readable instructions, data structures, program modules or other data in a modulated data signal such as a carrier wave or other transport mechanism and includes any information delivery media.

The system memory 1030*a* may include computer storage media in the form of volatile and/or nonvolatile memory such as read only memory (ROM) and/or random access memory (RAM). A basic input/output system (BIOS), containing the basic routines that help to transfer information between elements within computer 1010*a*, such as during start-up, may be stored in memory 1030*a*. Memory 1030*a* typically also contains data and/or program modules that are immediately accessible to and/or presently being operated on by processing unit 1020*a*. By way of example, and not limitation, memory 1030*a* may also include an operating system, application programs, other program modules, and program data.

The computer 1010*a* may also include other removable/non-removable, volatile/nonvolatile computer storage media. For example, computer 1010*a* could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus 1021*a* through a non-removable memory interface such as an interface, and a magnetic disk drive or optical disk drive is typically connected to the system bus 1021*a* by a removable memory interface, such as an interface.

A user may enter commands and information into the computer 1010*a* through input devices such as a keyboard and pointing device, commonly referred to as a mouse, trackball or touch pad. Other input devices may include a microphone, joystick, game pad, satellite dish, scanner, or the like. These and other input devices are often connected to the processing unit 1020*a* through user input 1040*a* and associated interface(s) that are coupled to the system bus 1021*a*, but may be connected by other interface and bus structures, such as a parallel port, game port or a universal serial bus (USB). A graphics subsystem may also be connected to the system bus 1021*a*. A monitor or other type of display device is also connected to the system bus 1021*a* via an interface, such as output interface 1050*a*, which may in turn communicate with video memory. In addition to a monitor, computers may also include other peripheral output devices such as speakers and a printer, which may be connected through output interface 1050*a*.

The computer 1010*a* may operate in a networked or distributed environment using logical connections to one or more other remote computers, such as remote computer 1070*a*, which may in turn have media capabilities different from device 1010*a*. The remote computer 1070*a* may be a personal computer, a server, a router, a network PC, a peer device or other common network node, or any other remote media consumption or transmission device, and may include any or all of the elements described above relative to the computer 1010*a*. The logical connections depicted in FIG. 10 include a network 1071*a*, such local area network (LAN) or a wide area network (WAN), but may also include other networks/buses. Such networking environments are commonplace in homes, offices, enterprise-wide computer networks, intranets and the Internet.

When used in a LAN networking environment, the computer 1010*a* is connected to the LAN 1071*a* through a network interface or adapter. When used in a WAN networking environment, the computer 1010*a* typically includes a communications component, such as a modem, or other means for establishing communications over the WAN, such as the Internet. A communications component, such as a modem, which may be internal or external, may be connected to the system bus 1021*a* via the user input interface of input 1040*a*, or other appropriate mechanism. In a networked environment, program modules depicted relative to the computer 1010*a*, or portions thereof, may be stored in a remote memory storage device. It will be appreciated that the network connections shown and described are exemplary and other means of establishing a communications link between the computers may be used.

Exemplary Distributed Computing Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office.NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software, such as an application programming interface (API), residing on a computing device, one or more portions of the invention may also be implemented via an operating system, or a "middle man" object, a control object, hardware, firmware, intermediate language instructions or objects, etc., such that the methods for communicating in accordance with the protocol of the invention may be included in, supported in or accessed via all of the languages and services enabled by managed code, such as .NET code, and in other distributed computing frameworks as well.

There are multiple ways of implementing the present invention, e.g., an appropriate API, tool kit, driver code, operating system, control, standalone or downloadable software object, etc. which enables applications and services to use the systems and methods for synchronizing data of the invention. The invention contemplates the use of the invention from the standpoint of an API (or other software object), as well as from a software or hardware object that implements the protocol of the invention. Thus, various implementations of the invention described herein may have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

As mentioned above, while exemplary embodiments of the present invention have been described in connection with various computing devices and network architectures, the underlying concepts may be applied to any computing device or system in which it is desirable to synchronize data. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the protocol of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") where used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD). . . ), smart cards, and flash memory devices (e.g., card, stick). Additionally, it is known that a carrier wave can be employed to carry computer-readable electronic data such as those used in transmitting and receiving electronic mail or in accessing a network such as the Internet or a local area network (LAN).

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described supra, methodologies that may be implemented in accordance with the disclosed subject matter will be better appreciated with reference to the flowcharts of FIGS. 3A, 3B, 3C, 3D, 7A and 7B. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

Furthermore, as will be appreciated various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of particular programming language constructs, the invention is not so limited, but rather may be implemented in any language to provide the synchronization communications protocol and methods of the invention. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

The invention claimed is:

1. A synchronization framework, the synchronization framework including: a server computer system; and
  a client computer system; wherein the server computer system includes:
  a server data store; and a processor for executing computer-executable instructions representing a sever sync adapter and a server sync provider, wherein the server sync adapter is configured to:
  receive requests from client sync providers to communicate data changes from occasionally connected applications to the server data store the requests including synchronization metadata including a last received synchronization anchor, the last received synchronization anchor generated at and received from the server computer system for a prior synchronization, the last received synchronization anchor indicative of a client synchronization state, the client synchronization state including enumerated changes to a client side version of a set of data groups that have occurred on the client computer system since the prior synchronization, the last received synchronization anchors transmitted in accordance with an extensible sync anchor model, the sync anchor model providing a protocol that carries an anchor type for the last received synchronization anchor between a client computer system and the server computer system; and send instructions back to client sync providers, the instructions indicating how to connect to the server data store, the instructions identifying that the server sync provider has been designated to interact with the server sync adapter to communicate data changes to the server data store;

communicate data changes received from occasionally connected applications through the server synch provider to the server data store;

generate a new synchronization anchor for the client sync providers, the new synchronization anchors comprising a temporal watermark; and the server computer system transmitting the new synchronization anchors to the client sync providers, the new synchronization anchors transmitted in accordance with the extensible sync anchor model, the sync anchor model providing a protocol that carries an anchor type for the new synchronization anchors between the server computer system and the client sync providers; and wherein the client computer system includes: a client data store; and a processor for executing computer-executable instructions representing an occasionally connected application, client sync provider and a client sync agent, wherein the client sync provider is configured to:

send a request to connect to the server data store to communicate data changes between the client data store and the server data store, the request including synchronization metadata including a last received synchronization anchor, the last received synchronization anchor generated at and received from the server computer system for a prior synchronization, the last received synchronization anchor indicative of a client synchronization state, the client synchronization state including enumerated changes to a client side version of a set of data groups that have occurred on the client computer system since the prior synchronization, the last received synchronization anchor transmitted in accordance with the extensible sync anchor model, the sync anchor model providing a protocol that carries an anchor type for the last received synchronization anchor between the client computer system and the server;

receive a new synchronization anchor from the server computer system, the new synchronization anchor generated by the server computer system, the new synchronization anchor transmitted in accordance with the extensible sync anchor model, the sync anchor model providing a protocol that carries an anchor type for the new synchronization anchor between the server and the client computer system; and maintain the new synchronization anchor for use in subsequent synchronizations;

wherein the client sync agent is configured to: accept requests from the client side sync provider; receive instructions from the server sync adapter indicating how to connect to the server data store, the instructions identifying that the server sync provider has been designated to interact with the server sync adapter to communicate the data changes to the server data store; and connect to the server sync provider; and wherein the server sync provider and the client sync agent are further configured to interoperate to:

orchestrate synchronization of data changes between the client data store and the server data store, synchronization including transporting the data changes in the data store agnostic format from the client sync agent to the server sync agent in accordance with a transport agnostic protocol.

2. The synchronization framework according to claim 1, wherein the client sync agent is one of a plurality of default client sync providers.

3. The synchronization framework according to claim 1, wherein the client sync agent is a client sync provider customized for one or more functions of the client application.

4. The synchronization framework according to claim 1, wherein the client sync agent propagates error, progress and conflict events to the client application.

5. The synchronization framework according to claim 1, wherein the client sync agent component instructs the server sync provider component to propagate inserts on the client storage to the server storage.

6. The synchronization framework according to claim 1, wherein the client sync agent component instructs the server sync provider component to propagate updates on the client storage to the server storage.

7. The synchronization framework according to claim 1, wherein the client sync agent component instructs the server sync provider component to propagate deletes on the client storage to the server storage.

8. The synchronization framework according to claim 1, wherein the client sync agent component instructs the server sync provider component to enumerate inserts that took place on the server storage since the last time the client storage synced.

9. The synchronization framework according to claim 1, wherein the client sync agent component instructs the server sync provider component to enumerate updates that took place on the server storage since the last time the client storage synced.

10. The synchronization framework according to claim 1, wherein the client sync agent component instructs the server sync provider component to enumerate deletes that took place on the server storage since the last time the client storage synced.

11. The synchronization framework according to claim 1, wherein the client sync agent component instructs the server sync provider component to obtain the existing row that led to the failure of insert, update or delete commands.

12. The synchronization framework according to claim 1, wherein the client sync agent component instructs the server sync provider component to obtain the existing row that led to the failure of insert, update or delete commands.

13. The synchronization framework according to claim 1, wherein the server sync provider component stores sync information for the at least one data group, enumerates incremental changes that took place on the server storage since the last sync, applies incremental changes to the server storage received from a client.

14. The synchronization framework according to claim 1, wherein the server sync provider component detects conflicting updates and enables resolution of the conflicts programmatically or interactively.

* * * * *